US012194613B2

(12) United States Patent
Nair et al.

(10) Patent No.: US 12,194,613 B2
(45) Date of Patent: Jan. 14, 2025

(54) TOOL STORAGE DEVICE

(71) Applicant: Milwaukee Electric Tool Corporation, Brookfield, WI (US)

(72) Inventors: Dilip Nair, Brookfield, WI (US); Matthew A. Wills, Shorewood, WI (US); James A. Cemke, Jr., Richfield, WI (US); Anna G. Tracy, Delafield, WI (US); Ian L. Christianson, Wauwatosa, WI (US); Andrew M. Tuchscherer, Wauwatosa, WI (US); Jared M. Amann, New Berlin, WI (US); Matthew A. Lownik, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/167,542

(22) Filed: Feb. 10, 2023

(65) Prior Publication Data
US 2023/0241760 A1    Aug. 3, 2023

Related U.S. Application Data

(63) Continuation of application No. PCT/US2023/061652, filed on Jan. 31, 2023.
(Continued)

(51) Int. Cl.
*B25H 3/06* (2006.01)
*B25H 3/04* (2006.01)
*F16M 13/02* (2006.01)

(52) U.S. Cl.
CPC .............. *B25H 3/06* (2013.01); *B25H 3/04* (2013.01); *F16M 13/025* (2013.01)

(58) Field of Classification Search
CPC .......... B25H 3/06; B25H 3/04; F16M 13/025
(Continued)

(56) References Cited

U.S. PATENT DOCUMENTS 1,286,588 A * 12/1918 Goodykoontz ...... F16M 13/025
                                                    312/351
3,269,550 A *  8/1966 Marcus .................... B25H 3/04
                                                    248/220.42
(Continued)

FOREIGN PATENT DOCUMENTS

CA        2251541 A1 *  4/1999 ........... A47B 81/005
CN        203510058         4/2014
(Continued)

OTHER PUBLICATIONS

"Why Cheap Ratcheting Bar Clamps Fail (And How To Fix Them)," YouTube, May 31, 2017, https://www.youtube.com/watch?v=hdJzVdUu99Y, 2 pages.
(Continued)

*Primary Examiner* — Taylor Morris
(74) *Attorney, Agent, or Firm* — Reinhart Boernet Van Deuren s.c.

(57) ABSTRACT

Tool support devices are provided. In some embodiments, the tool support device includes a storage tray and an adjustable mounting mechanism configured to engage and support the tool support device from a wall, such as a utility bucket wall. In other embodiments, the tool support device is a corner mounted device with a plurality of openings for support tools of different sizes.

19 Claims, 22 Drawing Sheets

Related U.S. Application Data

(60) Provisional application No. 63/395,442, filed on Aug. 5, 2022, provisional application No. 63/314,761, filed on Feb. 28, 2022, provisional application No. 63/307,410, filed on Feb. 7, 2022, provisional application No. 63/306,258, filed on Feb. 3, 2022.

(58) Field of Classification Search
USPC .................................................. 248/220.21
See application file for complete search history.

(56) References Cited

U.S. PATENT DOCUMENTS

| | | | |
|---|---|---|---|
| 3,822,847 A | 7/1974 | Emmons | |
| 3,829,051 A | 8/1974 | Emmons | |
| 4,343,172 A * | 8/1982 | Nordlund | B25H 3/04 |
| | | | 211/70.1 |
| 4,583,647 A * | 4/1986 | Schinzing | B25H 3/04 |
| | | | 211/60.1 |
| 4,708,311 A * | 11/1987 | Clausen | A47F 5/0846 |
| | | | 248/222.51 |
| 4,830,198 A * | 5/1989 | Colquitt | B44D 3/123 |
| | | | 211/13.1 |
| 4,867,332 A * | 9/1989 | Mains | B25H 3/04 |
| | | | 206/372 |
| 5,052,581 A | 10/1991 | Christ et al. | |
| 5,327,676 A | 7/1994 | Kosky | |
| 5,411,191 A | 5/1995 | Bunn, Jr. | |
| 5,588,543 A * | 12/1996 | Finger | A47F 5/083 |
| | | | 211/90.01 |
| 5,595,309 A * | 1/1997 | Bauer | A47F 5/0815 |
| | | | 248/220.31 |
| 5,641,142 A * | 6/1997 | Hanson | E06C 7/14 |
| | | | 248/210 |
| 5,704,496 A * | 1/1998 | Latta | B62B 1/262 |
| | | | 211/70.6 |
| 6,095,057 A * | 8/2000 | Corban | A47B 96/027 |
| | | | 108/42 |
| 6,460,697 B1 * | 10/2002 | Stevens | B44D 3/04 |
| | | | 206/233 |
| 6,481,583 B1 * | 11/2002 | Black | A47F 5/0815 |
| | | | 211/89.01 |
| 6,748,874 B2 | 6/2004 | Gawronski | |
| 6,769,553 B1 * | 8/2004 | Hurt | A47F 7/0028 |
| | | | 211/60.1 |
| 6,837,383 B1 | 1/2005 | McElhaney, Jr. | |
| 6,910,429 B1 | 6/2005 | Matay et al. | |
| 7,175,031 B2 * | 2/2007 | Matthews | B25H 3/04 |
| | | | 211/70.6 |
| 7,506,770 B2 * | 3/2009 | Rief | E04H 4/14 |
| | | | 211/70.6 |
| 7,537,125 B2 * | 5/2009 | Plouchart | B25H 3/04 |
| | | | 211/198 |
| 7,798,336 B2 * | 9/2010 | Shiao | B25H 3/04 |
| | | | 211/DIG. 1 |
| 7,909,181 B2 * | 3/2011 | Purushothaman | A47L 15/505 |
| | | | 211/41.8 |
| 7,938,279 B2 * | 5/2011 | Kaplan | A47K 3/281 |
| | | | 248/304 |
| 8,469,148 B2 | 6/2013 | Perry | |
| 8,517,320 B1 * | 8/2013 | Nicely | A47B 96/063 |
| | | | 248/220.21 |
| 8,584,888 B2 | 11/2013 | Buerk | |
| 8,882,409 B2 * | 11/2014 | Clark | B23B 47/287 |
| | | | 408/1 R |
| 9,056,756 B1 | 6/2015 | De Marco | |
| 9,089,208 B2 | 7/2015 | Zimmerman | |
| 9,096,350 B2 | 8/2015 | Buerk | |
| 9,321,168 B2 | 4/2016 | Brassette | |
| 9,452,882 B2 | 9/2016 | Buerk | |
| 9,469,438 B2 | 10/2016 | Nool | |
| 9,532,663 B2 * | 1/2017 | Nilsson | B25H 3/04 |
| 9,714,542 B1 * | 7/2017 | Harcz | E06C 7/14 |
| D810,321 S * | 2/2018 | Heffernan | D25/68 |
| 10,117,415 B2 | 11/2018 | Crews | |
| 10,151,425 B1 | 12/2018 | Bileth | |
| 10,195,735 B2 * | 2/2019 | Jenkins | B25H 3/003 |
| 10,213,915 B1 | 2/2019 | Demarco | |
| 10,357,875 B2 | 7/2019 | Mefferd | |
| 10,709,238 B1 * | 7/2020 | Thompson | A47B 96/066 |
| 10,750,719 B2 | 8/2020 | Crews | |
| 10,773,375 B2 | 9/2020 | Mefferd | |
| 11,154,177 B1 | 10/2021 | Johnson | |
| 11,167,407 B2 * | 11/2021 | McGee | B25H 3/02 |
| 11,198,538 B2 | 12/2021 | Goldstein | |
| 2001/0007343 A1 | 7/2001 | McElhaney, Jr. | |
| 2006/0016953 A1 | 1/2006 | Beck et al. | |
| 2006/0021985 A1 | 2/2006 | Jasper | |
| 2006/0102569 A1 | 5/2006 | Laga | |
| 2007/0187184 A1 | 8/2007 | Nasuti et al. | |
| 2008/0251476 A1 | 10/2008 | Shiao | |
| 2011/0068022 A1 * | 3/2011 | Koch, III | B25H 3/06 |
| | | | 248/224.8 |
| 2017/0014989 A1 | 1/2017 | McGee | |
| 2019/0285225 A1 | 9/2019 | Scott et al. | |
| 2020/0102119 A1 | 4/2020 | Cyzen | |
| 2022/0048674 A1 * | 2/2022 | Sexton | B65D 1/24 |
| 2023/0100084 A1 * | 3/2023 | Hargis | B66F 13/00 |
| | | | 211/94.01 |
| 2023/0144403 A1 * | 5/2023 | Coffey | B25H 3/04 |
| | | | 206/373 |
| 2023/0288019 A1 * | 9/2023 | Osborn | F16M 13/02 |
| 2024/0033897 A1 * | 2/2024 | Lindsay | B25H 3/06 |

FOREIGN PATENT DOCUMENTS

| | | | |
|---|---|---|---|
| CN | 203510178 | 4/2014 | |
| CN | 103264368 | 12/2014 | |
| CN | 203997250 | 12/2014 | |
| CN | 206976939 | 2/2018 | |
| CN | 108462093 | 8/2018 | |
| CN | 108656058 | 10/2018 | |
| CN | 208078506 | 11/2018 | |
| CN | 108972479 | 12/2018 | |
| CN | 209256874 | 8/2019 | |
| CN | 209364575 | 9/2019 | |
| CN | 210528399 | 5/2020 | |
| CN | 108748023 | 11/2020 | |
| CN | 212706683 | 3/2021 | |
| CN | 213499082 | 6/2021 | |
| CN | 214299162 | 9/2021 | |
| DE | 102004033080 | 1/2006 | |
| EP | 3120731 | 5/2018 | |
| FR | 2559415 A1 * | 8/1985 | ............. B25H 3/04 |
| FR | 2622828 A1 * | 5/1989 | ............. B25H 3/04 |
| GB | 2568683 A * | 5/2019 | ............. B25H 3/06 |
| WO | WO-8700018 A1 * | 1/1987 | ............. F16B 2/22 |
| WO | WO-02058515 A1 * | 8/2002 | ............. A47B 81/00 |
| WO | WO-2004011203 A1 * | 2/2004 | ............. B25H 3/04 |

OTHER PUBLICATIONS

International Search Report and Written Opinion for International Application No. PCT/US2023/061652, dated May 25, 2023, 10 pages.

* cited by examiner

TOOL STORAGE DEVICE

CROSS-REFERENCE TO RELATED PATENT APPLICATIONS

The present application is a continuation of International Application No. PCT/US2023/061652, filed Jan. 31, 2023, which claims the benefit of and priority to U.S. Provisional Application No. 63/395,442, filed on Aug. 5, 2022, U.S. Provisional Application No. 63/314,761, filed Feb. 28, 2022, U.S. Provisional Application No. 63/307,410, filed Feb. 7, 2022, U.S. Provisional Application No. 63/306,285, filed Feb. 3, 2022, each which is incorporated herein by reference in its entirety.

BACKGROUND OF THE INVENTION

The present invention relates generally to the field of tools. The present invention relates specifically to a mountable tool storage device.

SUMMARY OF THE INVENTION

One embodiment of the invention relates to a tool support device configured to couple to an interior corner of a mounting wall. The tool support device includes an upper wall defining an upper surface and an opposing lower surface, a plurality of support openings formed in the upper wall, the plurality of support openings configured to support a plurality of tools, a sidewall extending from the lower surface, a first channel configured to receive a hook that detachably couples the sidewall and the upper wall to the mounting wall, a first support wall, a second support wall, and a support. The sidewall includes a first portion and a second portion generally perpendicular to the first portion, and the sidewall defines an outer surface and an opposing inner surface. The first channel is defined by the first portion of the sidewall. The first support wall extends from the inner surface, and the first support wall defines a first side of the first channel. The second support wall extends from the inner surface, and the second support wall defines a second side of the first channel opposite the first side. The support extends between an intersection of the first support wall and the upper wall and an intersection of the second support wall and the upper wall.

Another embodiment of the invention relates to a tool support device configured to couple to an interior corner of a mounting wall. The tool support device includes an upper wall defining an upper surface and an opposing lower surface, a plurality of support openings formed in the upper wall, the plurality of support openings configured to support a plurality of tools, a first channel configured to receive a hook that detachably couples the sidewall and the upper wall to the mounting wall, a first support wall defining a first side of the first channel, a second support wall defining a second side of the first channel opposite the first side, and a bridge extending between the first support wall and the second support wall. The sidewall extends from the lower surface. The sidewall includes a first portion and a second portion generally perpendicular to the first portion, and the sidewall defines an outer surface and an opposing inner surface. The first channel is defined by the first portion of the sidewall. The first support wall extends from the inner surface. The second support wall extends from the inner surface. The bridge defines a recess including a recessed surface that is facing away from the outer surface of the first portion of the sidewall. The support wall extends from the bridge towards the upper wall. The support wall defines an inner surface facing away from the outer surface of the first portion of the sidewall, and the inner surface is coplanar with a center of the recessed surface.

Another embodiment of the invention relates to a tool support device configured to couple to an interior corner of a mounting wall. The tool support device includes an upper wall defining an upper surface and an opposing lower surface, a plurality of support openings formed in the upper wall, the plurality of support openings configured to support a plurality of tools, a sidewall extending from the lower surface to a bottom surface of the sidewall, a first channel configured to receive a hook that detachably couples the sidewall and the upper wall to the mounting wall, a first support wall defining a first side of the first channel, a first support wall extending from the inner surface, a second support wall extending from the inner surface, and a bridge extending between the first support wall and the second support wall. The sidewall includes a first portion and a second portion generally perpendicular to the first portion, and the sidewall defines an outer surface and an opposing inner surface. The first channel is defined by the first portion of the sidewall. The second support wall defines a second side of the first channel opposite the first side. The bridge defines a recess including a recessed surface that is facing away from the outer surface of the first portion of the sidewall. The bridge is between 30% and 70% of a distance from the upper surface of the upper wall to the bottom surface of the sidewall.

Another embodiment of the invention relates to a tool storage device including a tool support coupled to a mounting mechanism. The mounting mechanism is configured to engage a mounting wall and to support the tool storage device from the mounting wall. The mounting mechanism includes a mounting member that is adjustably coupled to the tool support. The mounting member is coupled to a pair of mounting arms. A pair of adjustment mechanisms are coupled to the tool support. Each mounting arm is slidably coupled to an adjustment mechanism. Actuation of the adjustment mechanism slides the mounting arm with respect to the adjustment mechanism, adjusting the distance between the mounting member and the tool support such that the mounting wall is clamped between the mounting member and the tool support. In specific embodiments, the mounting member is a U-shaped bar that extends downwardly from the pair or mounting arms. In other specific embodiments, the mounting member is an L-shaped plate.

In specific embodiments, the adjustment mechanism is a shaft collar. In specific embodiments, a locking mechanism is coupled to the adjustment mechanism. The locking mechanism is configured to transition from an unlocked position that allows the mounting arm to slide with respect to the adjustment mechanism and a locked position that fixes the mounting arm with respect to the adjustment mechanism.

Another specific embodiment relates to a tool storage device including a tool support removably coupled to a mounting mechanism. The mounting mechanism includes a first sidewall coupled to an opposing second sidewall. A plurality of first coupling components is coupled to the first sidewall of the mounting mechanism, and a plurality of second coupling components is coupled to an outer surface of the tool tray. At least one hook protrudes outwardly from the second sidewall of the mounting mechanism. The first coupling components correspond to and are configured to releasably mate with the second coupling components when the tool support is coupled to the mounting mechanism. In specific embodiments, the first coupling components are pockets, and the second coupling components are cleats. In more specific embodiments, the first sidewall is adjustably coupled to the second sidewall, such that the distance between the first sidewall and the second sidewall is adjustable. In other more specific embodiments, the first sidewall is fixedly coupled to the second sidewall.

Another embodiment relates to a tool storage device configured to be mounted to a corner section of a mounting wall or edge. The tool storage device has an L-shaped cross section formed by an upper wall and a sidewall that extends perpendicularly from an outer edge of the upper wall. The tool storage device includes a first leg and a second leg that together define a generally perpendicular angle. The sidewall includes an exterior surface, which defines a rounded corner where the first leg meets the second leg. A plurality of first support openings are defined in the upper wall, positioned along the first leg and the second leg. A second support opening is defined in the upper wall where the first leg meets the second leg. A pair of channels configured to receive a pair of hooks for mounting the tool storage device to a mounting wall are defined in each of the first and second legs.

In specific embodiments, each pair of channels includes a first channel defined in the upper wall and a second channel defined in both the upper wall and the sidewall. In another specific embodiment, the second support opening is circular.

Another embodiment relates to a tool storage device configured to be mounted to a corner section of a mounting wall or edge. The tool storage device has an L-shaped cross section formed by an upper wall and a sidewall that extends perpendicularly from an outer edge of the upper wall. The tool storage device includes a first leg and a second leg that together define a generally perpendicular angle. The sidewall includes an exterior surface, which defines a rounded corner where the first leg meets the second leg. A plurality of support openings are defined in the upper wall. A first channel is formed in the sidewall and upper wall. The channel is L-shaped and configured to receive a hook for mounting the tool storage device. A hook support protrudes inwardly from an interior surface of the sidewall at a location corresponding to the first channel. The hook support includes a ledge configured to engage the hook when the hook is positioned within the first channel. The ledge is positioned below the upper wall.

Additional exemplary embodiments relate to other features and combinations of features as described herein.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Tool Storage Device With Adjustable Mounting Mechanism

Referring generally to FIGS. 1-12, various embodiments of a tool storage device including a tool support (e.g., tray, bucket, holster etc.) coupled to an adjustable mounting mechanism are shown. The mounting mechanism is configured to mount and support the tool storage device from a structure. In certain work environments, it is convenient to removably/reversibly mount a tool storage device to an edge of a mounting wall, such as the wall of a power utility bucket.

In the context of a power utility bucket, the mounting wall may have a lip protruding from a mounting edge at the desired mounting location that hinders secure attachment of the storage device by means of a typical mounting mechanism. Further, the size of the lip and angle of the mounting wall may vary between mounting locations. Applicant has designed an adjustable mounting mechanism to accommodate mounting walls with mounting edges and/or lips of different sizes and shapes.

Additionally, workers often find it convenient to leave the tool storage device attached to the utility bucket when the utility bucket is driven between worksites, leaving the mounted storage device prone to vibrations during transport. In some instances, if the stored tools will be of use for interim tasks, workers may find it convenient to remove the tool tray portion of the device from the mounting mechanism to mount the tool tray to a wall or toolbox for interim access to the stored tools. Applicant has further designed a tool storage device for mounting the tool storage device securely to a lipped edge, even under vibrational movement, and/or allowing temporary removal and remounting of the tool tray in a location apart from the power utility bucket.

Figure 1:
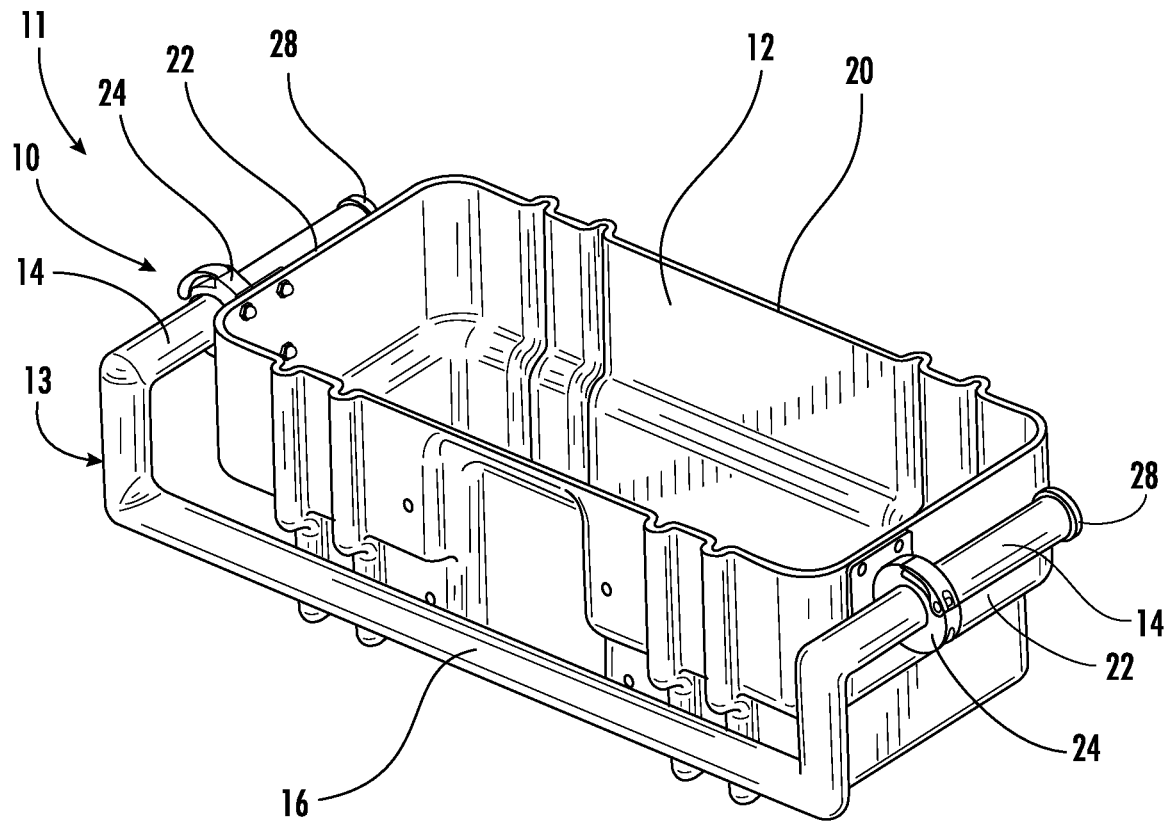
FIG. 1 is a perspective view of a tool storage device including a mounting mechanism, according to an exemplary embodiment.
Figure 35:
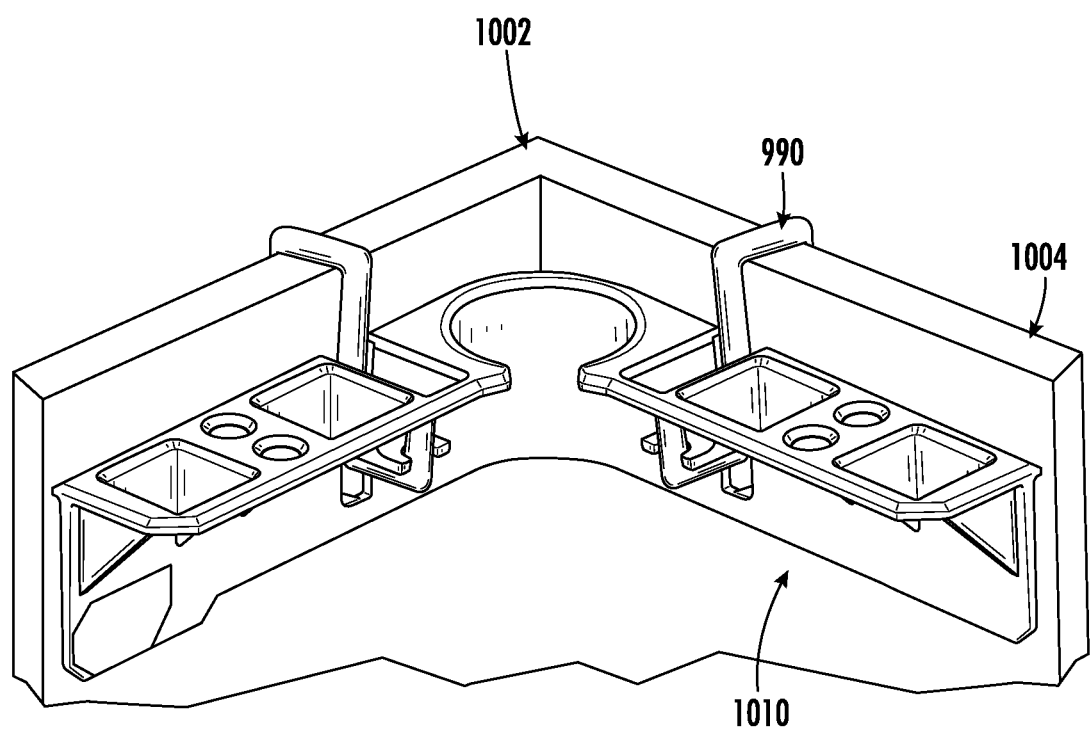
FIG. 35 is a perspective view of another tool storage device coupled to a mounting wall via two hooks, according to another exemplary embodiment.
Figure 36:
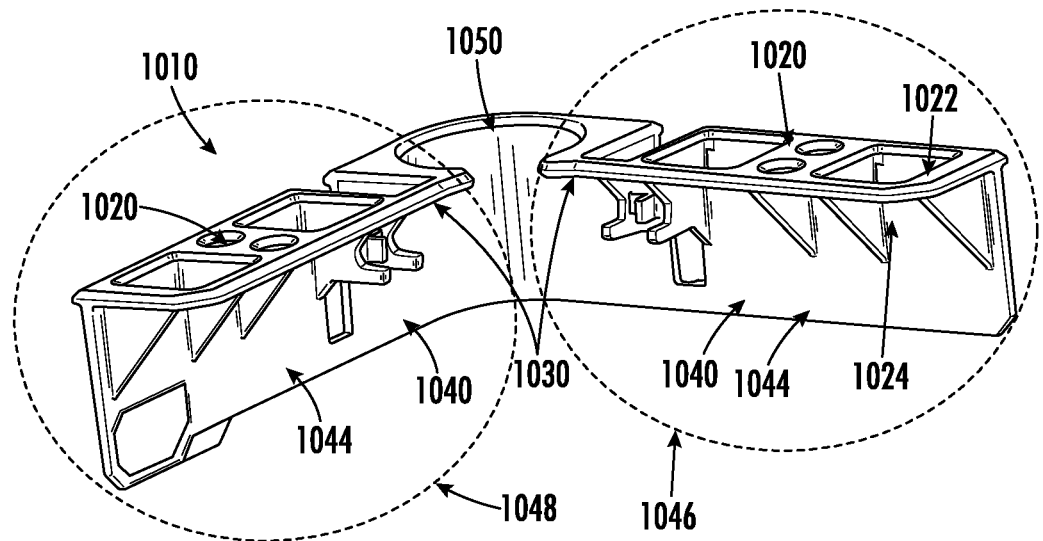
FIG. 36 is a perspective view of the tool storage device of FIG. 35, according to an exemplary embodiment.
Figure 37:
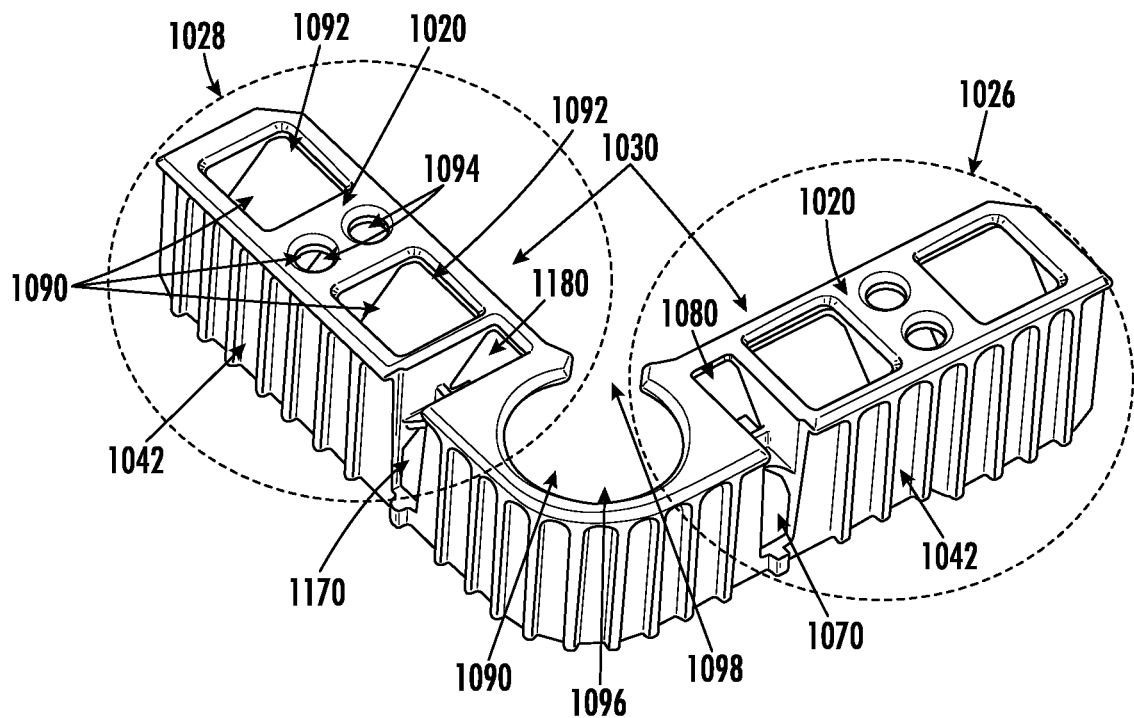
FIG. 37 is a perspective view of the tool storage device of FIG. 35, according to an exemplary embodiment.
Figure 38:
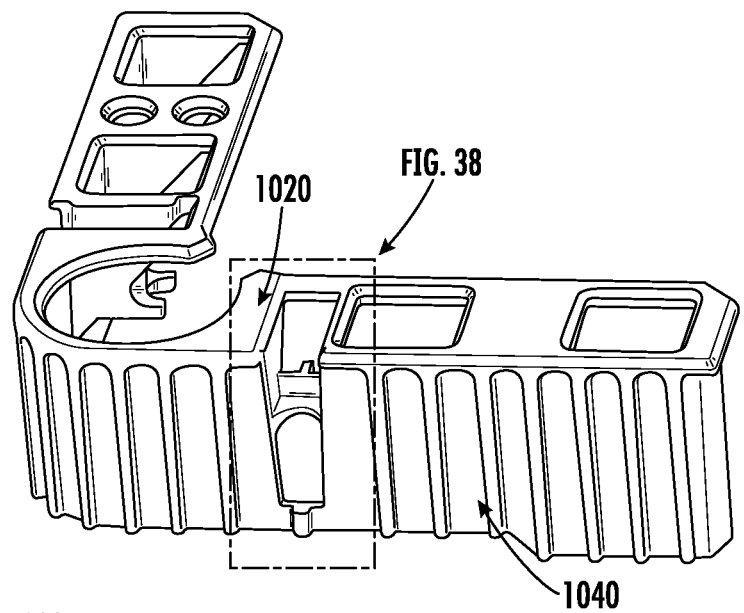
FIG. 38 is a perspective view of the tool storage device of FIG. 35, according to an exemplary embodiment.
Figure 39:
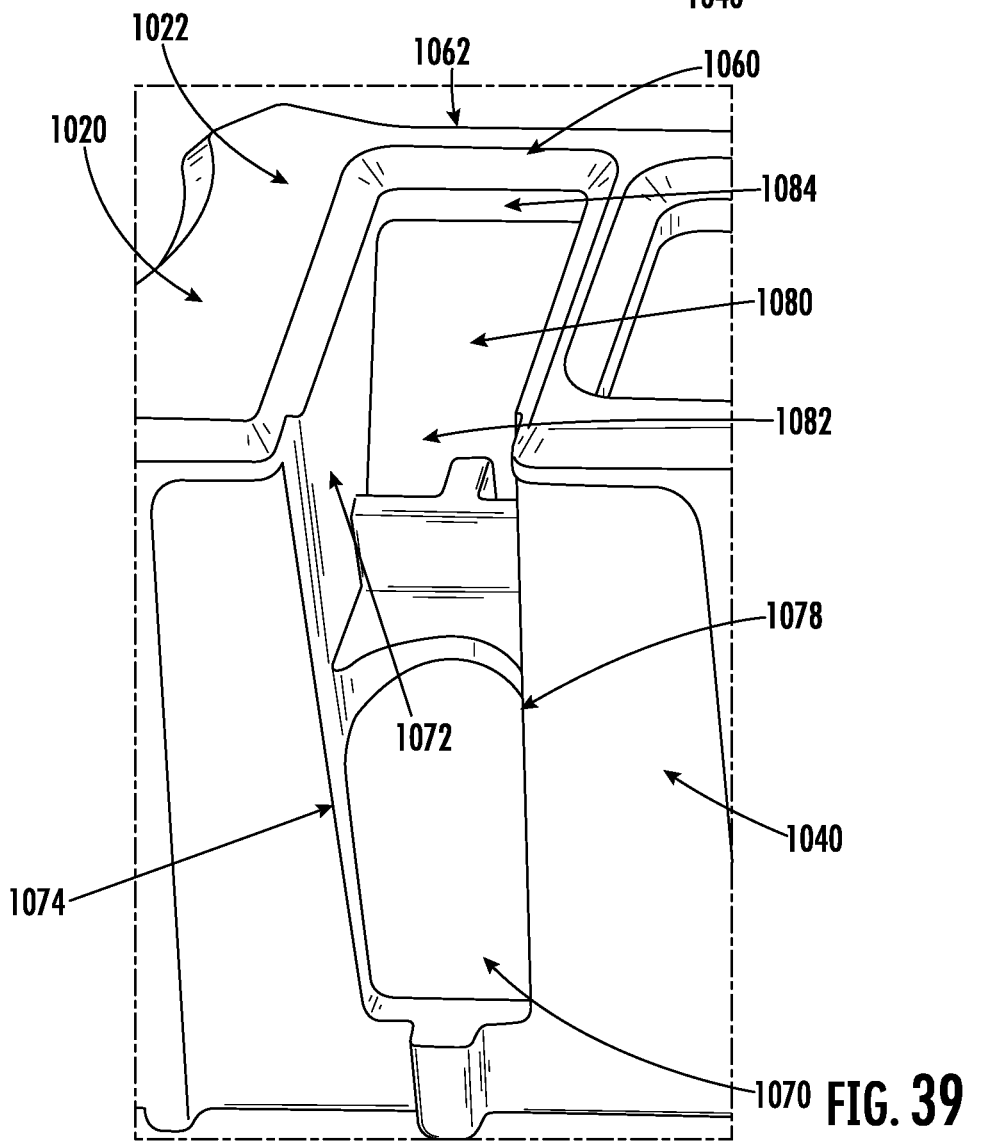
FIG. 39 is a detailed perspective view of the tool storage device of FIG. 35, according to an exemplary embodiment.

Referring to FIG. 1, a tool storage device 11, including mounting mechanism 10 and tool tray 12 is shown. Mounting mechanism 10 is coupled to a tool support (e.g. a tool tray, bucket, holster, etc.), shown as tool tray 12. Mounting mechanism 10 is configured to couple tool tray 12 to a wall, mounting wall 1004 of a utility bucket (FIG. 35). Mounting mechanism 10 includes a mount 13 adjustably connected to a pair of shaft collars 24. The mount 13 includes a pair of arms 14 coupled to opposite ends of a mounting member, specifically a U-shaped mounting bar 16. As shown in FIG. 1, the mounting bar 16 extends downwardly from mounting arms 14 (specifically, extends away from the upper edge 20 of the tool tray 12). In specific embodiments, mount 13 includes a bar having a generally circular cross section. In more specific embodiments, the generally circular cross section has a diameter of approximately one inch.

Arms 14 are configured to extend over the mounting wall (e.g., mounting wall 1004 of FIG. 35) so that mounting bar 16 extends along the side of the mounting wall opposite the side of the mounting wall facing tool tray 12. The arms 14 are slidably connected to opposing sidewalls 22 of tool tray 12 by a shaft collar 24. Shaft collar 24 is movable between an unlocked, disengaged, or loosened position, in which the arm 14 is allowed to slide axially with respect to the shaft collar 24, and a locked, engaged, or secured position (shown in FIG. 1), in which the arm 14 is secured against axial sliding with respect to shaft collar 24. In specific embodiments, a threaded stopper 28 is applied to each end of the mount 13. During adjustment, when collar 24 is in a loosened position, threaded stopper 28 prevents mount 13, specifically arms 14, from sliding out of shaft collars 24. This prevents tool tray 12 from detaching from mount 13 while mounting adjustments are being made. If the user desires to remove mount 13 from tool tray 12, for example, for storage purposes, threaded stoppers 28 can be unthreaded and removed from mount 13.

To mount tool tray 12 to a mounting wall, shaft collar 24 is loosened, and arms 14 are slid with respect to the respective shaft collars 24 a sufficient distance to allow the mount 13 to be positioned over the mounting wall, such that at least a portion of mounting bar 16 is positioned on an opposite side of the mounting wall from tool tray 12. Arms 14 are then slid with respect to the respective shaft collars 24 in a direction drawing mounting bar 16 toward the mounting wall and tool tray 12. When desired level of mounting securement is achieved, specifically when tool tray 12 and mounting bar 16 are respectively drawn sufficiently close to the mounting wall to secure the tool tray 12 to the mounting wall, the shaft collar 24 is transitioned to a secured position. Specifically, when the desired level of mounting securement is achieved, the mounting wall is captured/clamped between mounting bar 16 and the outer surface of tool tray 12. As such, mounting mechanism 10 provides for universal, rather than stepped, adjustment to accommodate any mounting wall and/or lip thicknesses within a given range.

Figure 2:
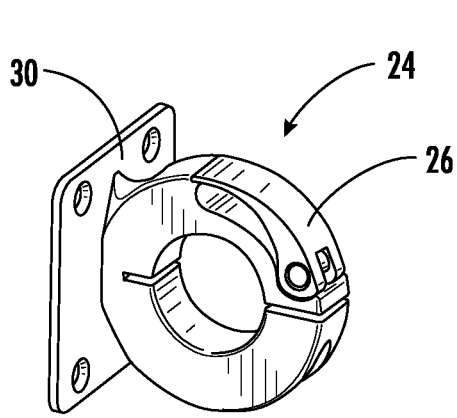
FIG. 2 is an enlarge perspective view of a shaft collar of the mounting mechanism shown in FIG. 1, according to an exemplary embodiment.

As shown in FIG. 1, each shaft collar 24 is operated by a cam lock or cam lever 26. An enlarged view of shaft collar 24, attached to a mounting plate 30, is shown in FIG. 2. As shown in FIG. 2, the shaft collar is in a secured position. To transition the shaft collar 24 to a loosened position, the cam lever 26 is rotated outwardly. In other embodiments, other forms of shaft collars are used, such as shaft collar 32 (shown in FIG. 3), which is operated by a threaded lever 34. To transition the shaft collar 32 between an open and closed position, the level handle 36 is rotated about the lever rod 38 in a first direction for securement, and in a second, opposite, direction for loosening.

Figure 4:
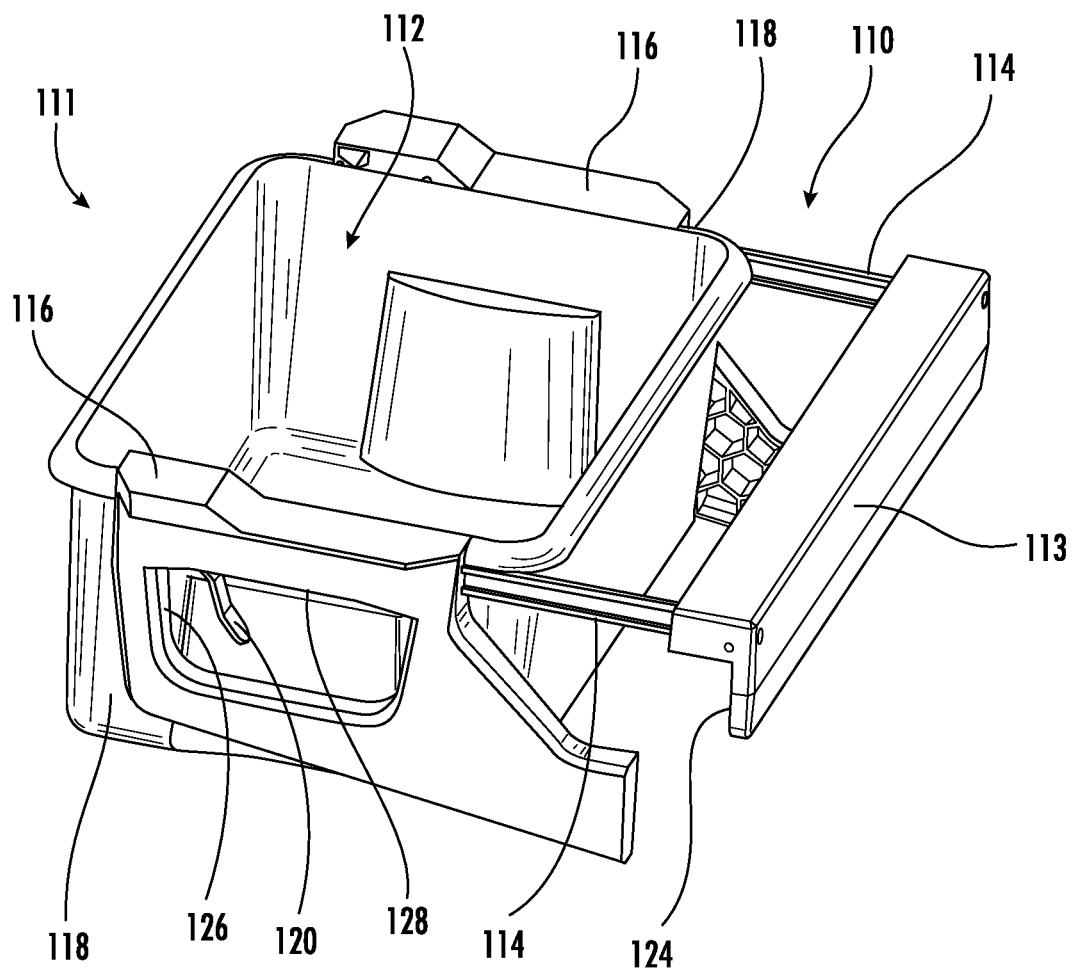
FIG. 4 is a perspective view of a tool storage device including a mounting mechanism, according to another exemplary embodiment.
Figure 5:
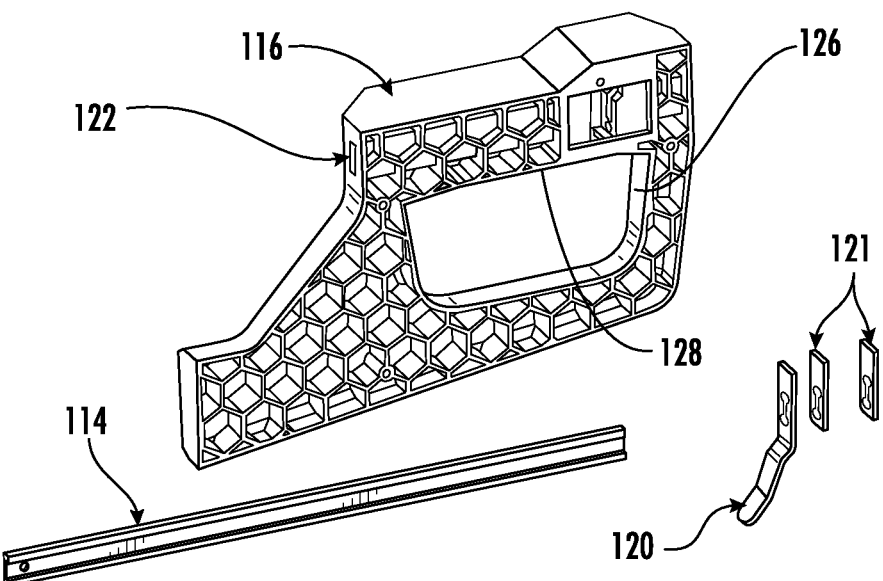
FIG. 5 is an exploded perspective view of a trigger mechanism of the mounting mechanism shown in FIG. 4, according to an exemplary embodiment.

Referring to FIGS. 4 and 5, a tool storage device 111 is shown according to an exemplary embodiment. Tool storage device 111 includes a mounting mechanism 110. In general, mounting mechanism 110 acts to mount tool storage device 111 to a mounting wall (such as mounting wall 1004 of a utility bucket FIG. 35), similar to tool storage device 11 discussed above, utilizing the different mechanisms discussed herein. Specifically, as shown in FIG. 4, mounting mechanism 110 is coupled to a tool support or tool tray 112. Mounting mechanism 110 includes an L-shaped mounting plate 113 coupled to a pair of mounting arms 114. A pair of trigger housings 116 are respectively coupled to opposite sidewalls 118 of tool tray 112. Mounting arms 114 are each adjustably coupled to one of the trigger housings 116. During operation, the mounting arms are transitioned between locked and unlocked positions by a trigger assembly positioned on at least one or both of the trigger housings 116. The trigger assembly includes a spring-loaded trigger 120 and a pair of internal locking plates 121 that are positioned at least in part within the trigger housing. When trigger 120 is in a released or unactuated position, locking plates 121 lock mounting arm 114 in place with respect to trigger housing 116, specifically, prevent mounting arm 114 from sliding within channel 122 of trigger housing 116. When trigger 120 is actuated, mounting arm 114 is unlocked or released, specifically readily slidable with respect to trigger housing 116 within channel 122.

To mount tool tray 112 to a mounting wall, mounting arms 114 are positioned over the mounting wall and tool tray 112 is lowered until tool tray 112 and at least a portion of mounting plate 113 are positioned on opposite sides of the mounting wall, with mounting plate 113 extending across a top of the wall (such as mounting wall 1004 of a utility bucket FIG. 35). The trigger assembly is then actuated by applied pressure from the user, such as by the press of a user's finger, to trigger 120, which unlocks mounting arms 114. With trigger 120 actuated, the user applies pressure to the mounting plate 113, pushing mounting plate 113 toward tool tray 112 (as mounting arms 114 are slid into corresponding channels 122) until a desired level of mounting securement is achieved, specifically until tool tray 112 and an interior surface 124 of mounting plate 113, respectively, are drawn sufficiently close to the mounting wall to secure the tool tray 112 to the mounting wall.

As shown in FIG. 4, the trigger 120 is positioned in a generally vertical orientation, such that trigger 120 is pressed towards a rear interior wall 126 of trigger housing 116 during actuation. In other embodiments, trigger 120 is positioned in a generally horizontal orientation, such that trigger 120 is pressed or drawn by a grip of the user's fingers towards an upper interior wall 128 of trigger housing 116 during actuation. As shown in FIG. 4, the mounting mechanism 110 includes a single trigger 120, and actuation of trigger 120 releases both mounting arms 114 into the unlocked position. In other specific embodiments, each housing 116 includes a trigger 120 and accompanying parts of the trigger assembly, and the user can actuate both triggers coincidingly to coincidingly release each corresponding mounting arm 114. In some specific embodiments, the trigger assembly may include an advancing trigger that draws mounting arms 114 further into each respective trigger housing 116, specifically into the mounting channel 122, each time the advancing trigger is actuated.

Figure 6:
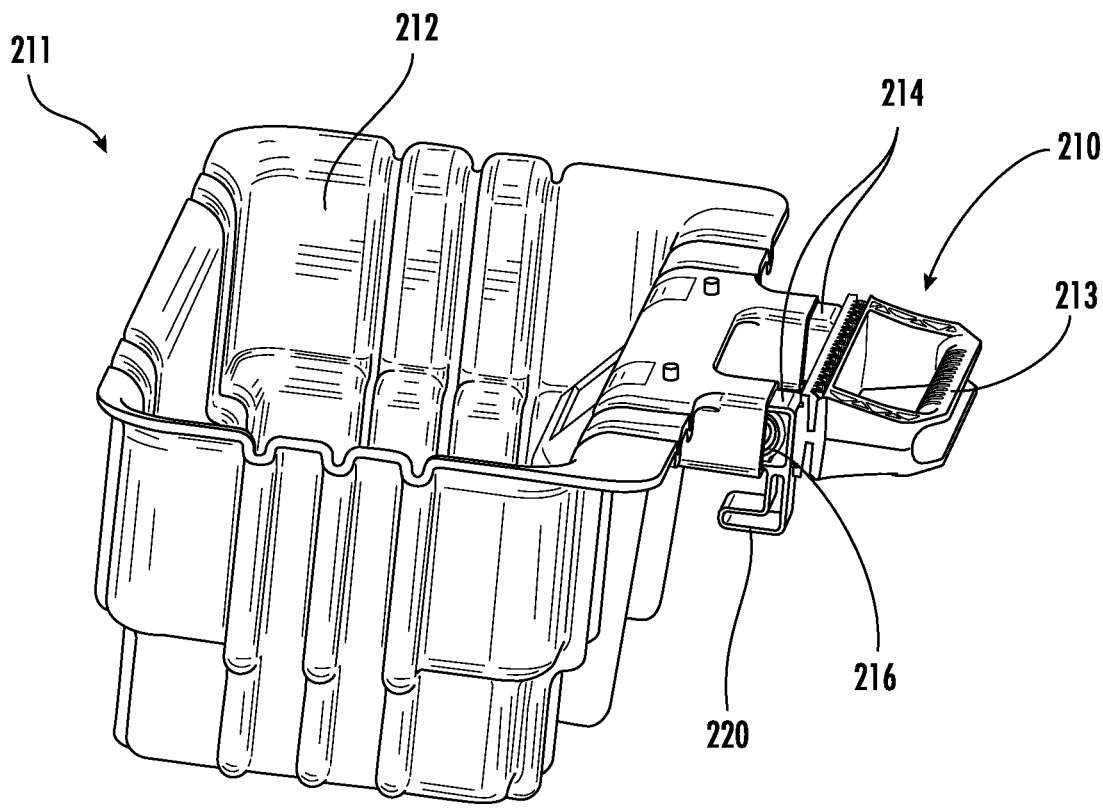
FIG. 6 is a perspective view of a tool storage device including a mounting mechanism, according to another exemplary embodiment.
Figure 7:
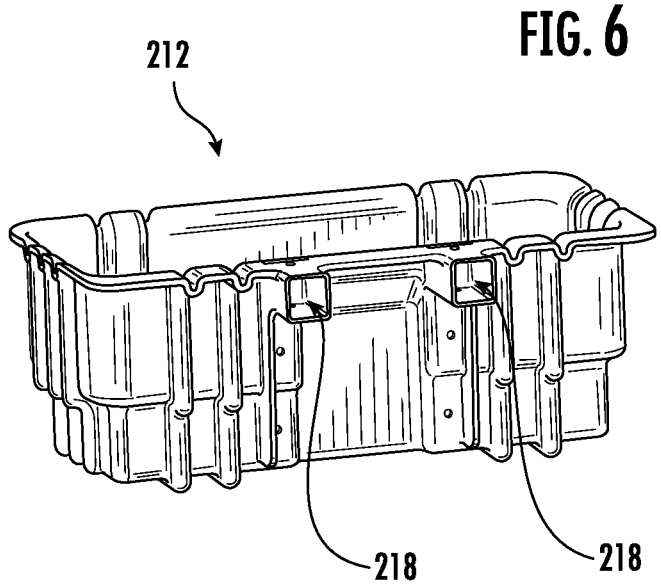
FIG. 7 is a perspective view of the tool storage device shown in FIG. 6, with the mounting mechanism removed, according to an exemplary embodiment.
Figure 8:
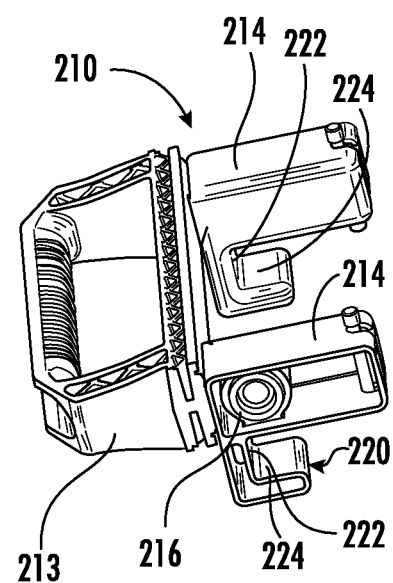
FIG. 8 is a perspective view of the mounting mechanism of the tool storage device shown in FIG. 6, according to an exemplary embodiment.

Referring to FIGS. 6-8, a tool storage device 211 is shown according to an exemplary embodiment. Tool storage device 211 includes a mounting mechanism 210. In general, mounting mechanism 210 acts to mount tool storage device 211 to a mounting wall, similar to tool storage device 11 discussed above, utilizing the different mechanisms discussed herein. As shown in FIG. 6, mounting mechanism 210 is a spring-biased handle that is coupled to and biased toward a tool support or tool tray 212. The mounting mechanism 210 includes a handle grip 213 coupled to a pair of arms 214. Each arm 214 houses a spring 216 that biases mounting mechanism 210 toward tool tray 212, specifically biases arms 214 inwardly within channels 218 of tool tray 212. In specific embodiment, spring 216 is a constant-force torsion spring. A gripping structure or gripping portion 220 extends from each arm 214. Gripping portion 220 is configured to grip an outwardly protruding lip of a mounting wall or edge when the tool tray 212 is mounted using mounting mechanism 210. As shown in FIGS. 6 and 8, gripping portion 220 is L-shaped and formed by an upper portion 222 that suspends substantially perpendicularly from each arm 214, and a lower portion 224 that extends substantially perpendicularly from upper portion 222. As shown in FIG. 6, upon assembly, lower portion 224 extends toward tool tray 212.

To mount tool tray 212 to a mounting wall or edge having an outwardly protruding lip, a user grips handle grip 213 and draws (e.g., pulls) handle grip 213 away from tool tray 212, drawing arms 214, in part, from channels 218. Tool tray 212 is then lowered until tool tray 212 and at least a portion of gripping portion 220 are positioned on opposite sides of the mounting wall and lower portion 224 of gripping portion 220 is positioned at a height below the height of the outwardly protruding lip, such as by positioning arms 214 on a top of a mounting wall, such as mounting wall 1004 of FIG. 35. The user then releases gripping pressure on handle grip 213, allowing springs 216 to draw arms 214 inwardly into channels 218, drawing the mounting mechanism 210 towards the tool tray 212, and specifically, drawing the lower portion 224 of gripping portion 220 underneath the lip of the mounting wall, securing tool tray 212 to the mounting wall.

Figure 9:
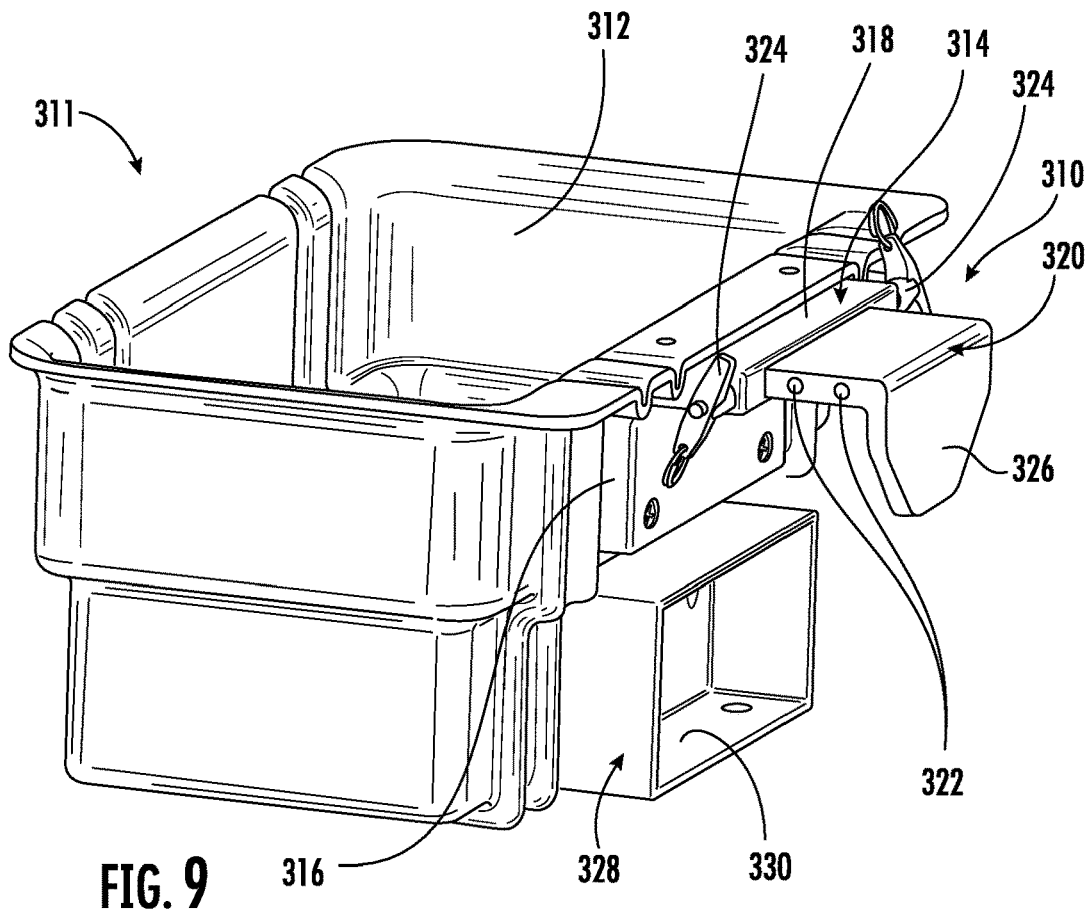
FIG. 9 is a perspective view of a tool storage device including a mounting mechanism, according to another exemplary embodiment.

Referring to FIG. 9, a tool storage device 311 is shown according to an exemplary embodiment. Tool storage device 311 includes a mounting mechanism 310. In general, mounting mechanism 310 acts to mount tool storage device 311 to a mounting wall, similar to tool storage device 11 discussed above, utilizing the different mechanisms discussed herein. Mounting mechanism 310 includes an L-shaped mounting panel 314. Mounting panel 314, specifically a lower portion 316, is coupled to the tool tray 312. Mounting panel 314, specifically an upper portion 318, receives an L-shaped mounting plate 320 with a downwardly extending lip 326. To secure mounting plate 320 to a mounting wall, mounting plate 320 is lower to interface against a top of the mounting wall. Mounting plate 320 defines a series of openings 322, specifically holes, positioned between the lip 326 and the tool tray 312. The openings 322 are configured to, in-turn, align with a coinciding opening defined in upper portion 318 of mounting panel 314 and to receive a quick release pin 324, to secure mounting plate 320 to mounting panel 314 in a given position. As shown in FIG. 9, two quick release pins 324 are used to secure mounting plate 320 to mounting panel 314. Mounting plate 320 includes a downwardly extending lip 326, positioned a greater distance than openings 322 from mounting panel 314. Though FIG. 9 shows greater detail of the right side of mounting mechanism 310, compared to the left side, the left side of mounting mechanism 10 is substantially the same as the right side.

Additionally, a spacer 328 is coupled to tool tray 312, beneath mounting panel 314. Spacer 328 provides additional support for tool tray 312 to rest in a more upright position. Spacer 328 may also be decoupled from tool tray 312, rotated 90 degrees from the position shown in FIG. 9, and recoupled to tool tray 312, with wall 330 coupled to tool tray 312, if a wider spacer is desired—thus offering the user two width options for spacing. In specific embodiments, the width options of spacer 328 are 2 inches and 3 inches.

Figure 10:
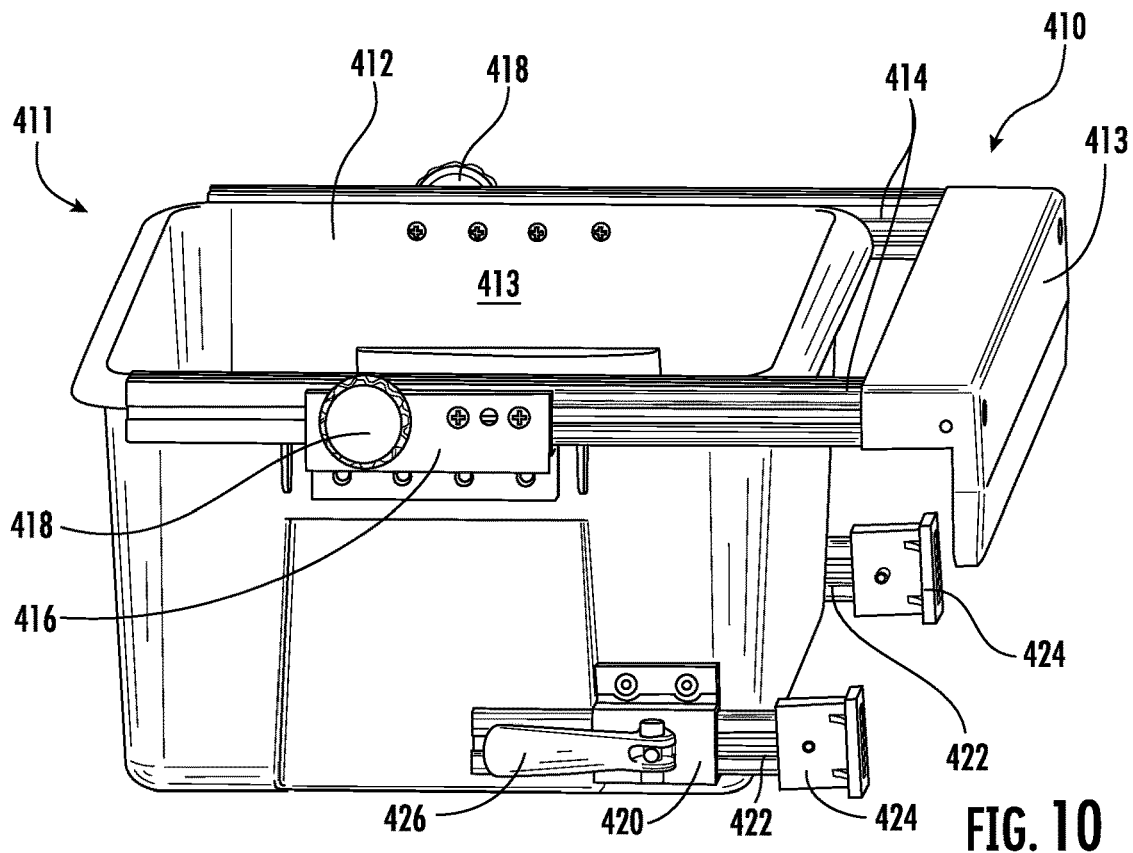
FIG. 10 is a perspective view of a tool storage device including a mounting mechanism, according to another exemplary embodiment.

Referring to FIG. 10, a tool storage device 411 is shown according to an exemplary embodiment. Tool storage device 411 includes a mounting mechanism 410. In general, mounting mechanism 410 acts to mount tool storage device 411 to a mounting wall, similar to tool storage device 11 discussed above, utilizing the different mechanisms discussed herein. Mounting mechanism 410 includes a mounting member, specifically an L-shaped mounting plate 413, coupled to a pair of mounting arms 414. A pair of mounting brackets 416 are respectively coupled to opposing sides of tool tray 412. Each mounting bracket 416 receives a respective mounting arm 414. A mounting arm locking mechanism 418 is attached to the mounting bracket 416. Mounting arm locking mechanism 418 is configured to transition between an unlocked position, in which mounting arm 414 is allowed to slide freely within mounting bracket 416, and a locked position, in which mounting arm 414 is fixed with respect to mounting bracket 416. In specific embodiments, a pair of adjustment brackets 420 are respectively coupled to opposite sides of tool tray 412. Adjustment brackets 420 each receive an adjustment arm 422. An adjustment stand-off 424 is coupled to an end of each adjustment arm 422. Adjustment arms 422 are slidable with respect to adjustment brackets 420, such that the stand-offs 424 can be positioned to provide extra support against the mounting wall to which tool tray 412 is secured, in the event the mounting edge has a protruding lip or other variance in width. An adjustment arm locking mechanism 426 is coupled to each adjustment bracket 420. As shown in FIG. 10, mounting arm locking mechanism 418 is a locking knob, and adjustment arm locking mechanism 426 is a cam lock or cam lever. Though FIG. 10 shows greater detail of the right side of the mounting and adjustment mechanisms, compared to the left side, the left side is substantially the same as the right side.

Figure 3:
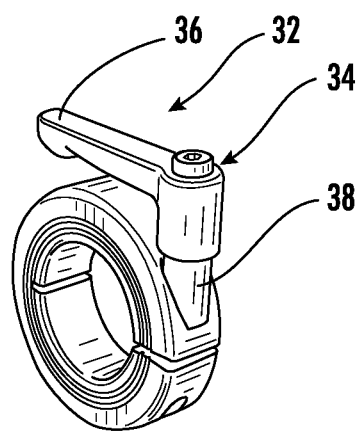
FIG. 3 is an enlarge perspective view of a shaft collar, according to another exemplary embodiment.
Figure 11:
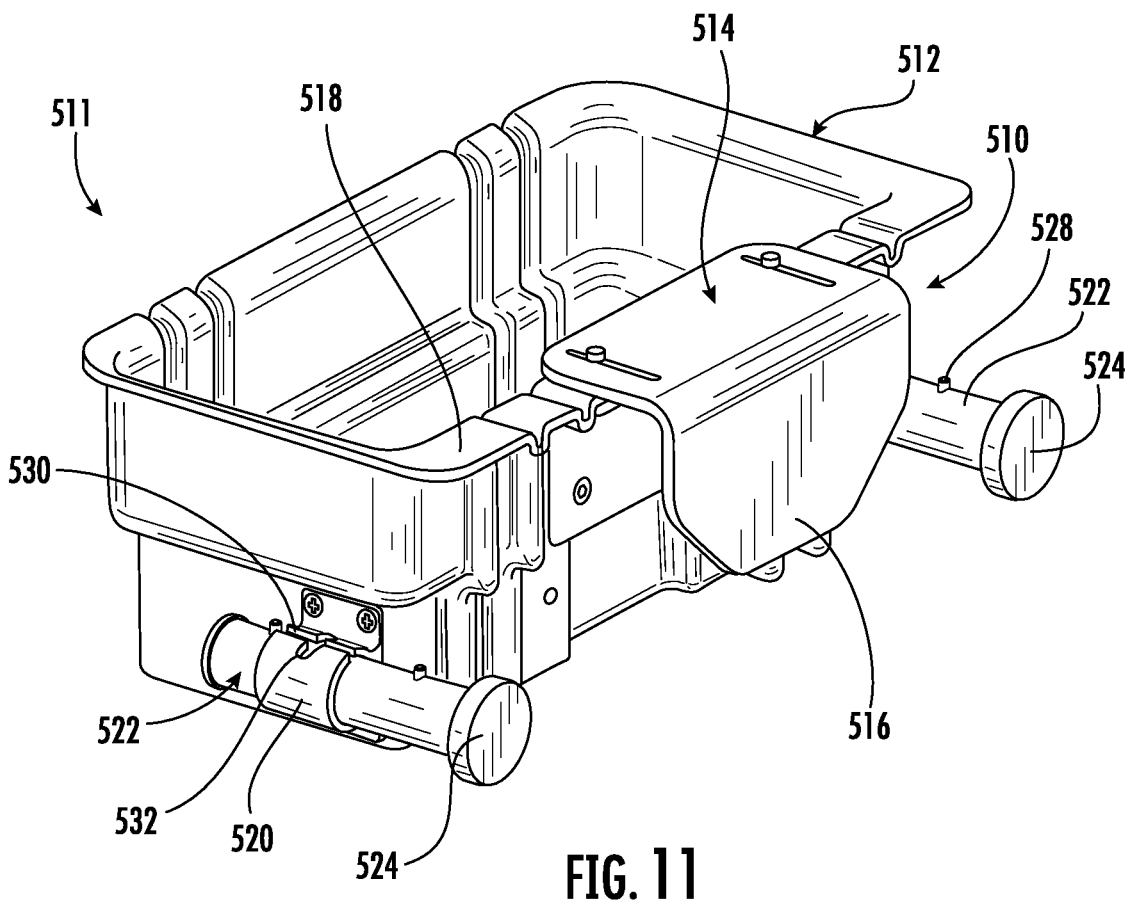
FIG. 11 is a perspective view of a tool storage device including a mounting mechanism, according to another exemplary embodiment.

Referring to FIG. 11, a tool storage device 511 is shown according to an exemplary embodiment. Tool storage device 511 includes a mounting mechanism 510. In general, mounting mechanism 510 acts to mount tool storage device 511 to a mounting wall, similar to tool storage device 11 discussed above, utilizing the different mechanisms discussed herein. A mounting member, specifically an L-shaped mounting plate 514, is slidably connected to an upper edge 518 of tool tray 512. Mounting plate 514 includes a downwardly-extending lip 516 that is drawn toward tool tray 512 when mounting plate 514 is slid with respect to upper edge 518 to secure tool tray 512 to a mounting wall or edge. In specific embodiments, a pair of adjustment brackets 520 are respectively coupled to opposite sides of tool tray 512. Adjustment brackets 520 each receive an adjustment arm 522. An adjustment stand-off 524 is coupled to an end of adjustment arm 522. Adjustment arms 522 are slidable with respect to adjustment brackets 520, such that the stand-offs 524 can be positioned to provide extra support against the mounting wall to which tool tray 512 is secured, in the event the mounting edge has a protruding lip or other variance in width. Each adjustment arm 522 includes a plurality of protruding prongs 528. Each adjustment bracket 520 defines a channel 530 and a groove 532 adjacent the channel 530. To adjust the distance at which adjustment arm 522 extends beyond adjustment bracket 520, adjustment arm 522 can be rotated axially until prongs 528 align with channel 530 and slid axially along adjustment bracket 520 until a desired position is reached. Adjustment arm 522 can then be rotated axially until a prong 528 corresponding to groove 532 is positioned within groove 532, thus locking adjustment arm 522 against further axial sliding with respect to adjustment bracket 520. In other specific embodiments, an adjustment arm without prongs is used with another form of adjustment mechanism, such as a shaft collar operated by a cam or threaded lever (as shown in FIGS. 2 and 3). Though FIG. 11 shows greater detail of the right side of the mounting and adjustment mechanisms, compared to the left side, the left side is substantially the same as the right side.

Figure 12:
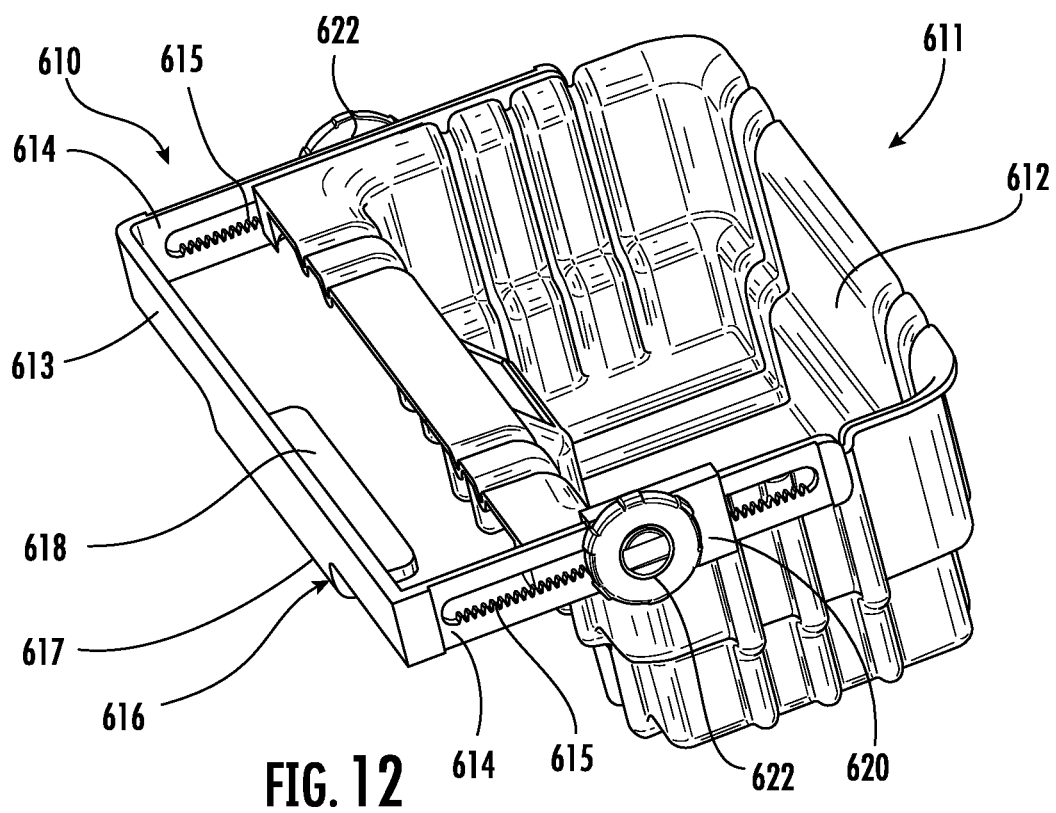
FIG. 12 is a perspective view of a tool storage device including a mounting mechanism, according to another exemplary embodiment.

Referring to FIG. 12, a tool storage device 611 is shown according to an exemplary embodiment. Tool storage device 611 includes a mounting mechanism 610. In general, mounting mechanism 610 acts to mount tool storage device 611 to a mounting wall, similar to tool storage device 11 discussed above, utilizing the different mechanisms discussed herein. Mounting mechanism 610 includes a mounting bar 613 coupled to a pair of mounting arms 614. Each mounting arm 614 includes an internal ratcheting surface 615. An L-shaped mounting plate 616 extends downwardly from mounting bar 613, specifically an upper portion 617 extends downwardly from mounting bar 613, and a lower portion 618 extends substantially perpendicularly from upper portion 617 in a direction toward tool tray 612. When tool tray 612 is mounted to a mounting edge having a protruding lip, mounting bar 613 and/or lower portion 618 extends beneath the lip, thereby vertically coupling mounting mechanism 3050 to the mounting wall. A pair of mounting brackets 620 are coupled to opposing sides of tool tray 612. A ratcheting adjustment knob 622 is coupled to each mounting bracket 620. When ratcheting adjustment knob 622 is rotated, adjustment arm 614 interacts with ratcheting surface 615 to ratchet mounting plate 616 in a direction that draws mounting plate 616 nearer to tool tray 612. Though FIG. 12 shows greater detail of the left side of the mounting mechanism, compared to the right side, the left side is substantially the same as the right side.

Referring generally to FIGS. 13-27, various additional embodiments of tool trays with various mounting mechanisms are shown. As shown in FIGS. 13-27, tool trays that use removable engageable coupling mechanisms are shown. In various embodiments, as will be discussed in greater detail below, the coupling mechanisms are sliding cleats and pockets (one of which uses standard Milwaukee Tool PACKOUT compatible cleats and pockets) to removably attach the tray to the bucket. In such embodiments, a mounting bracket attaches to the bucket. The mounting bracket includes female and/or male coupling component(s) and the tool tray includes corresponding female and/or male coupling components. In such embodiments, the tool tray removably attaches to the mounting bracket, and the mounting bracket can stay secured to the bucket even after the tool tray is removed. When moving from location to location, the user can easily take the tool tray (with whatever is stored in the tool tray) off of the mounting bracket and place it securely in a storage box on the truck. Then the tool tray can be reattached to the mounting bracket when the bucket and tools in the tool tray are to be used again.

Figure 13:
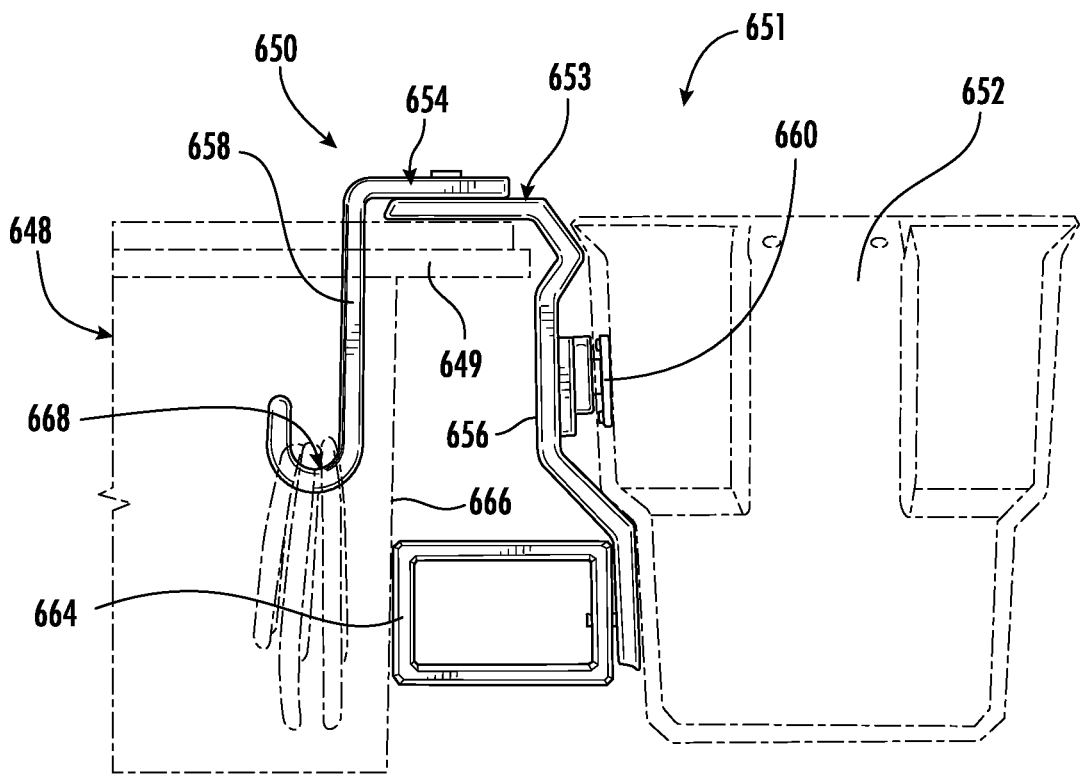
FIG. 13 is a side view of a tool storage device including a mounting mechanism, according to another exemplary embodiment.

Referring to FIG. 13, a tool storage device 651 is shown according to an exemplary embodiment. As shown in FIG. 13, tool storage device 651 is mounted to a power utility bucket 648 that has a protruding lip 649. In general, mounting mechanism 650 acts to mount tool storage device 651 to a mounting wall 666, similar to tool storage device 11 discussed above, utilizing the different mechanisms discussed herein.

Tool storage device 651 includes a mounting mechanism 650 removably coupled to a tool support, specifically, tool tray 652. As shown in FIG. 13, mounting mechanism 650 is an adjustable bracket that includes a first bracket component 653 slidably coupled to a second bracket component 654. First bracket component 653 includes a first sidewall 656, and second bracket component 654 includes a second sidewall 658, positioned opposite the first sidewall 656. When first bracket component 653 is adjusted or slid with respect to second bracket component 654, the distance between first sidewall 656 and second sidewall 658 is adjusted, specifically, is narrowed or widened, to accommodate mounting walls of varying thicknesses and/or mounting lips of varying sizes.

In specific embodiments, a first coupling component, specifically a cleat 660, is coupled to first sidewall 656, extending toward tool tray 652. An outer surface of tool tray 652 includes a corresponding second coupling component, specifically an integrally formed pocket, that receives and mates with the cleat 660 to releasably couple tool tray 652 to mounting mechanism 650.

Additionally, as shown in FIG. 13, a spacer 664 is coupled to mounting mechanism 650, positioned between first sidewall 656 and mounting wall 666 of the power utility bucket 648 when tool storage device 651 is mounted to power utility bucket 648. Spacer 664 provides additional support for tool tray 652 to rest in a more upright position. Spacer 664 may also be decoupled from mounting mechanism 650, rotated 90 degrees from the position shown in FIG. 13, and recoupled to mounting mechanism 650, if a narrower spacer is desired—thus offering the user two width options for spacing. Further, a hook 668 extends from the second sidewall 658 into an interior of power utility bucket 648, such that tools, cords, etc. may be hung on the interior of power utility bucket 648. Though FIG. 13 shows greater detail of the left side of the tool storage device 651, compared to the right side, the left side is substantially the same as the right side. Additionally, specific embodiments include a second cleat, substantially similar to cleat 660, and a corresponding pocket to receive the second cleat, on the opposite side of tool storage device 651.

Figure 14:
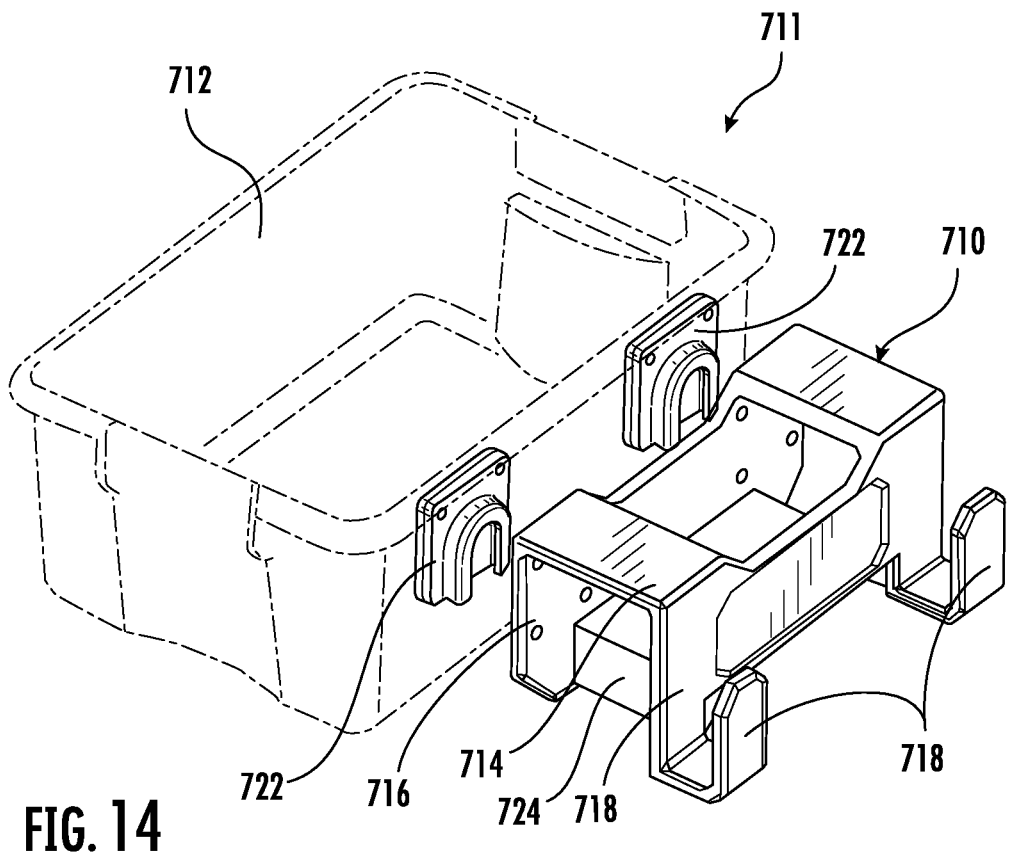
FIG. 14 is a top perspective view of a tool storage device including a mounting mechanism, according to another exemplary embodiment.
Figure 15:
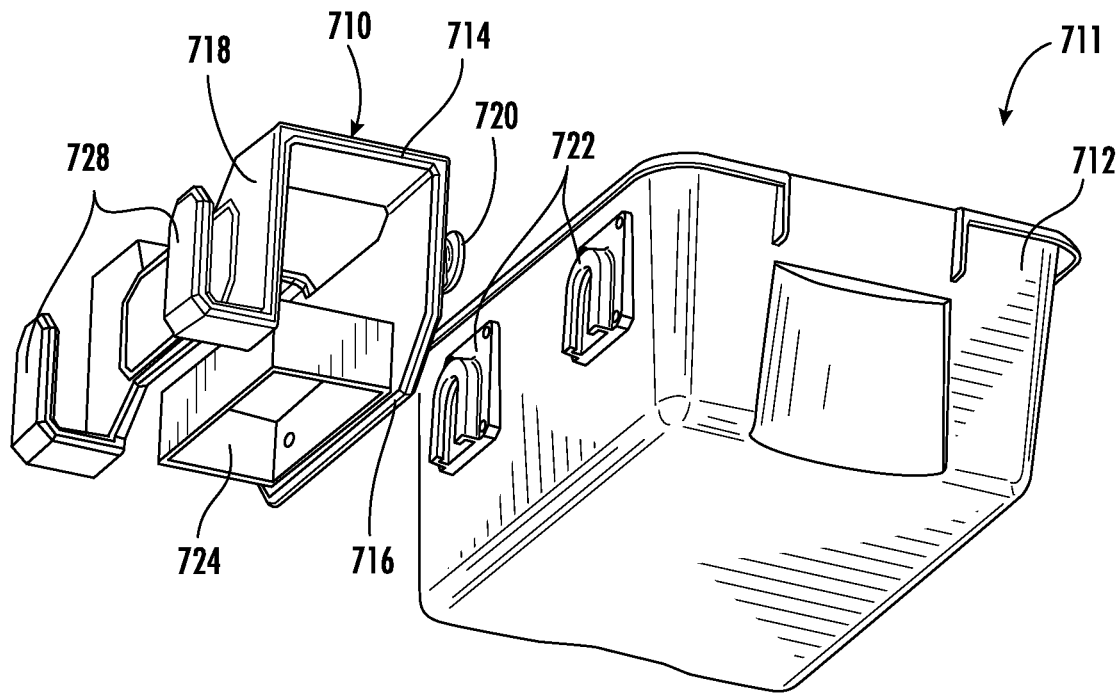
FIG. 15 is a bottom perspective view from the front of the tool storage device shown in FIG. 14, according to an exemplary embodiment.
Figure 16:
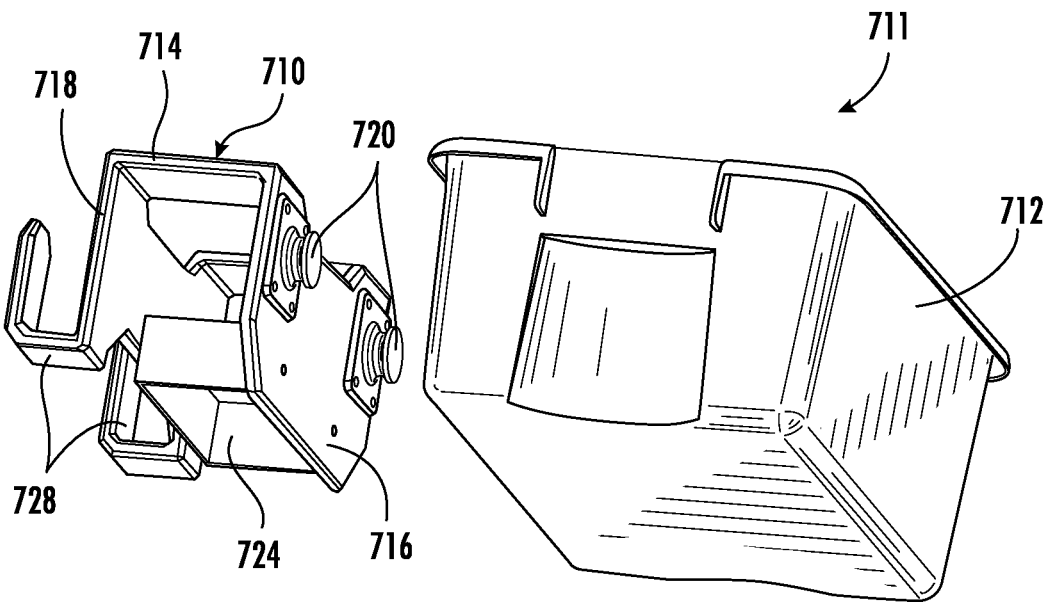
FIG. 16 is a bottom perspective view from the rear of the tool storage device shown in FIG. 14, according to an exemplary embodiment.
Figure 17:
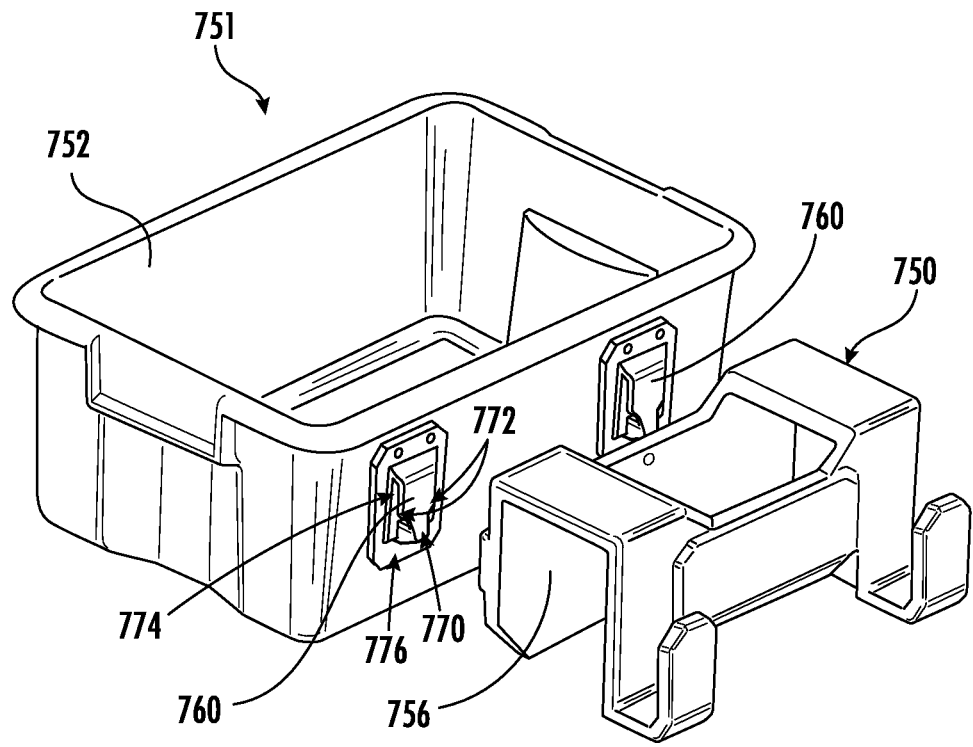
FIG. 17 is a perspective view from the right of a tool storage device including a mounting mechanism, according to another exemplary embodiment.
Figure 18:
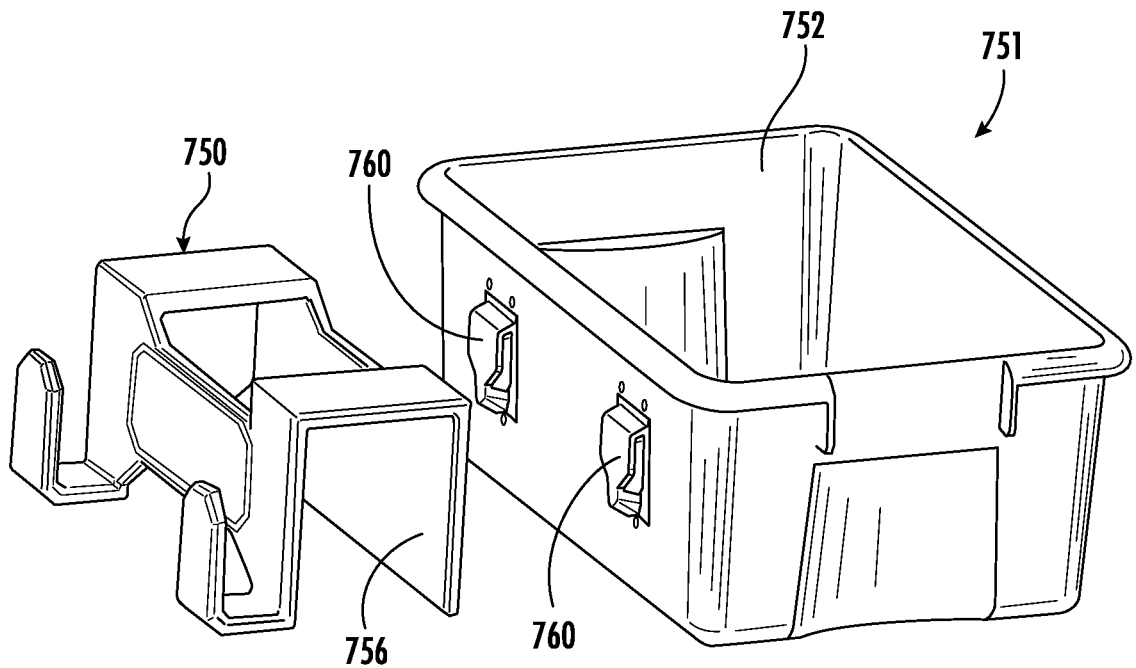
FIG. 18 is a perspective view from the left of the tool storage device shown in FIG. 17, according to an exemplary embodiment.

Referring to FIGS. 14-16, a tool storage device 711 is shown according to an exemplary embodiment. Tool storage device 711 includes a mounting mechanism 710 configured to removably couple to a tool support, specifically, tool tray 712. In general, mounting mechanism 710 acts to mount tool storage device 711 to a mounting wall, similar to tool storage device 11 discussed above, utilizing the different mechanisms discussed herein. In specific embodiments, tool storage device 711 is configured to be mounted to a power utility bucket with a protruding lip. As shown in FIGS. 14-16, mounting mechanism 710 is a bracket that includes a first sidewall 716 fixedly coupled to a second sidewall 718 by an upper wall 714.

In specific embodiments, a plurality of first coupling components, specifically cleats 720, are coupled to first sidewall 716, extending toward the tool tray 712, when tool tray 712 is coupled to mounting mechanism 710. An outer surface of tool tray 712 includes a corresponding plurality of second coupling components, specifically downward-opening, U-shaped pockets 722, that receive and respectively mate with cleats 720 to releasably couple tool tray 712 to mounting mechanism 710. In specific embodiments, cleats 720 are coupled to an outer surface of tool tray 752. As shown in FIG. 16, cleats 720 are circular cleats with a curvature that substantially corresponds to the curvature of the upper portion of the U-shape defined by pocket 722.

Additionally, as shown in FIGS. 14-16, a spacer 724 is coupled to mounting mechanism 710, positioned between first sidewall 716 and second sidewall 718. Spacer 724 provides additional support for tool tray 712 to rest in a more upright position. Spacer 724 may also be decoupled from mounting mechanism 710, rotated 90 degrees from the position shown in FIGS. 14-16, and recoupled to mounting mechanism 710, if a narrower spacer is desired—thus offering the user two width options for spacing. Further, a plurality of hooks 728 extends from the second sidewall 718, such that hooks 728 extend into an interior of the power utility bucket, when the tool storage device is coupled to the power utility bucket, allowing tools, cords, etc. to be hung on the power utility bucket interior.

Referring to FIGS. 17-21, a tool storage device 751 is shown according to an exemplary embodiment. Tool storage device 751 includes a mounting mechanism 750 configured to removably couple to a tool support, specifically, tool tray 752. In general, mounting mechanism 750 acts to mount tool storage device 751 to a mounting wall, similar to tool storage device 11 discussed above, utilizing the different mechanisms discussed herein. Further, tool storage device 751 is substantially the same as tool storage device 711, except for the difference described herein.

In specific embodiments, a plurality of first coupling components, specifically cleats 760, are coupled to an outer wall of tool tray 752, extending toward mounting mechanism 750, when tool tray 752 is coupled to mounting mechanism 750. In various embodiments, each of cleats 760 includes an internal body 770 extending from tool tray 752. Two ribs 772 extend from the body 770 in opposite directions. Each rib 772 defines a channel that extends from a closed back end 774 to an open front end 776.

Figure 19:
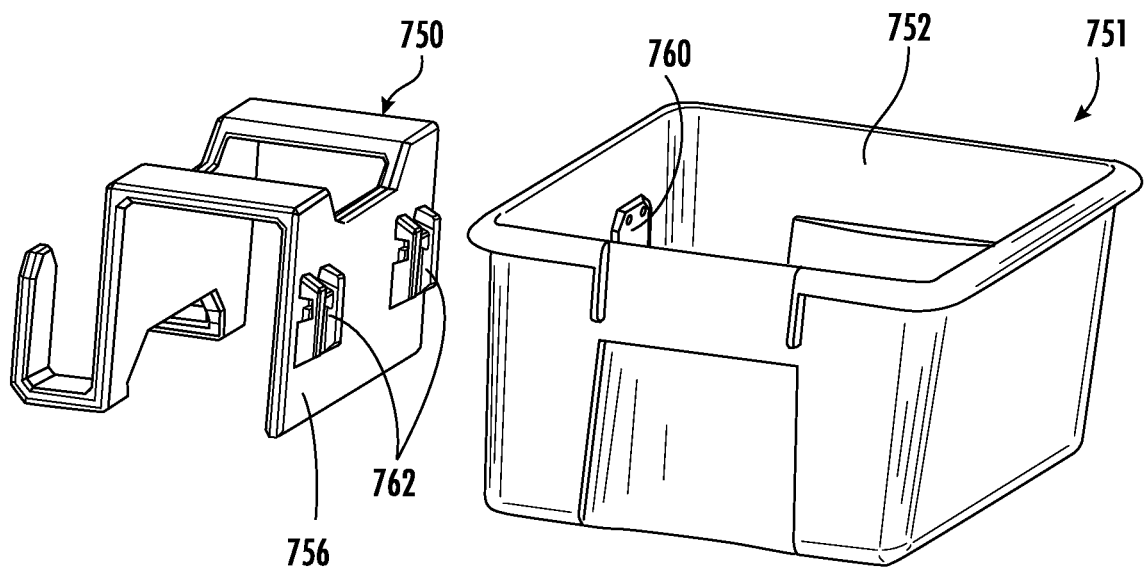
FIG. 19 is a perspective view from the rear of the tool storage device shown in FIG. 17, according to an exemplary embodiment.
Figure 20:
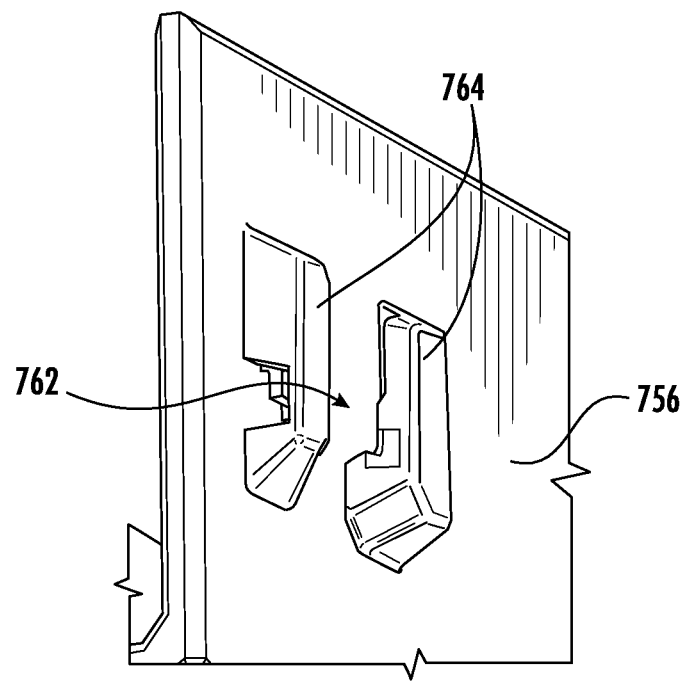
FIG. 20 is a detailed perspective view of a portion of the tool storage device shown in FIG. 19.
Figure 21:
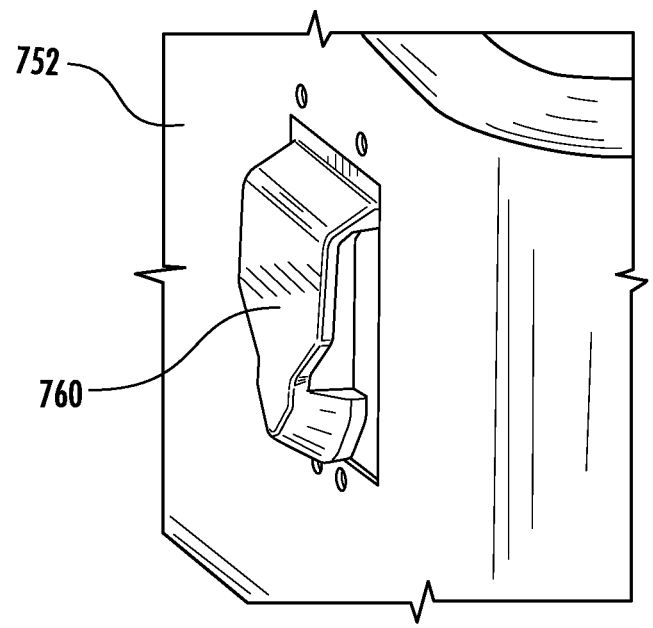
FIG. 21 is a detailed perspective view of a portion of the tool storage device shown in FIG. 18.

A first sidewall 756 of mounting mechanism 750 includes a corresponding plurality of second coupling components, specifically pockets 762, that receive and mate with cleats 760 to releasably couple tool tray 752 to mounting mechanism 750. As shown in FIGS. 19-20, pockets 762 are integrally formed in mounting mechanism 750. Pockets 762 include two opposing arms 764 open at respective upper ends, to receive a corresponding cleat 760. As shown in FIGS. 17-21, the cleats 760 and pockets 762 are compatible with corresponding narrow cleats and pockets of the Milwaukee Tool PACKOUT system. In a specific embodiment, cleats 760 and pockets 762 are compatible with the coupling mechanism(s) described in International Patent International Patent Publication No. WO 2017/191628, which is hereby incorporated by reference in its entirety.

Referring to FIGS. 22-25, a tool storage device 811 is shown according to an exemplary embodiment. Tool storage device 811 includes a mounting mechanism 810 configured to removably couple to a tool support, specifically, tool tray 812. In general, mounting mechanism 810 acts to mount tool storage device 811 to a mounting wall, similar to tool storage device 11 discussed above, utilizing the different mechanisms discussed herein. Further, tool storage device 811 is substantially the same as tool storage device 751, except for the difference described herein.

Figure 22:
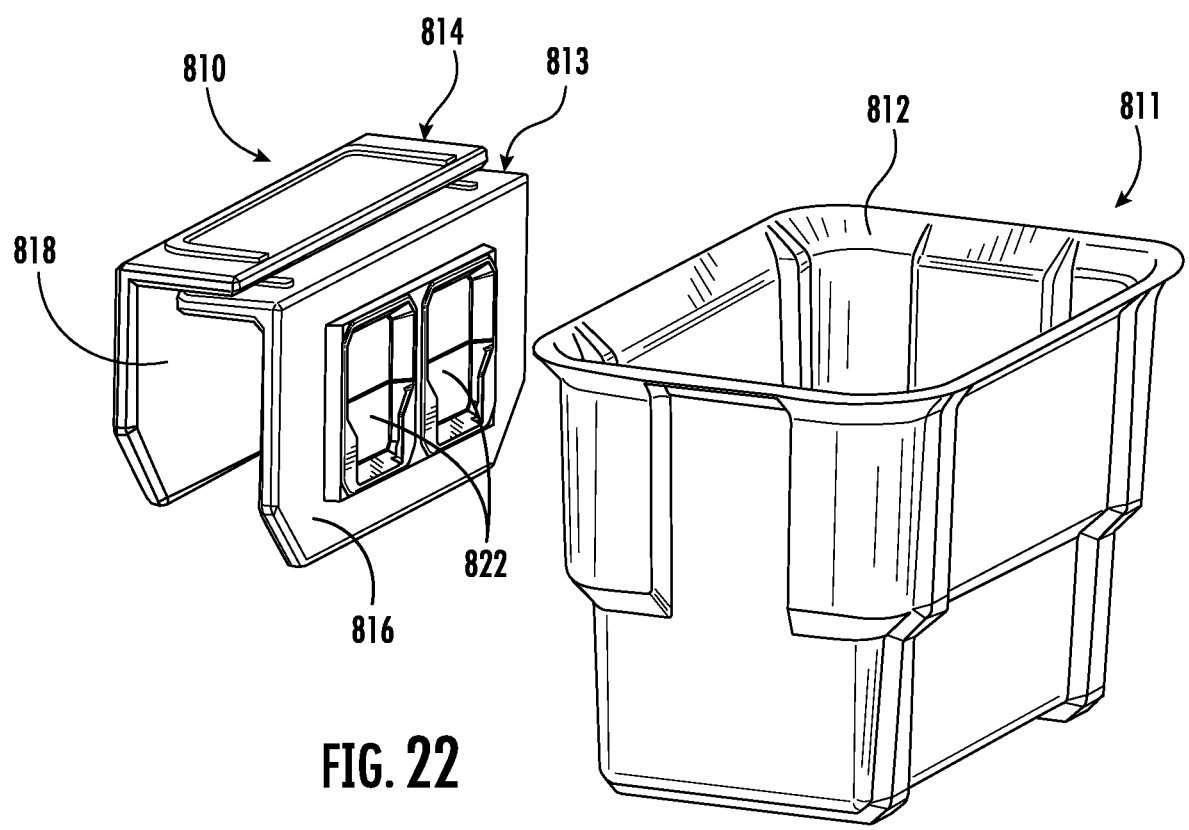
FIG. 22 is a perspective view from the rear of a tool storage device including a mounting mechanism, according to another exemplary embodiment.
Figure 23:
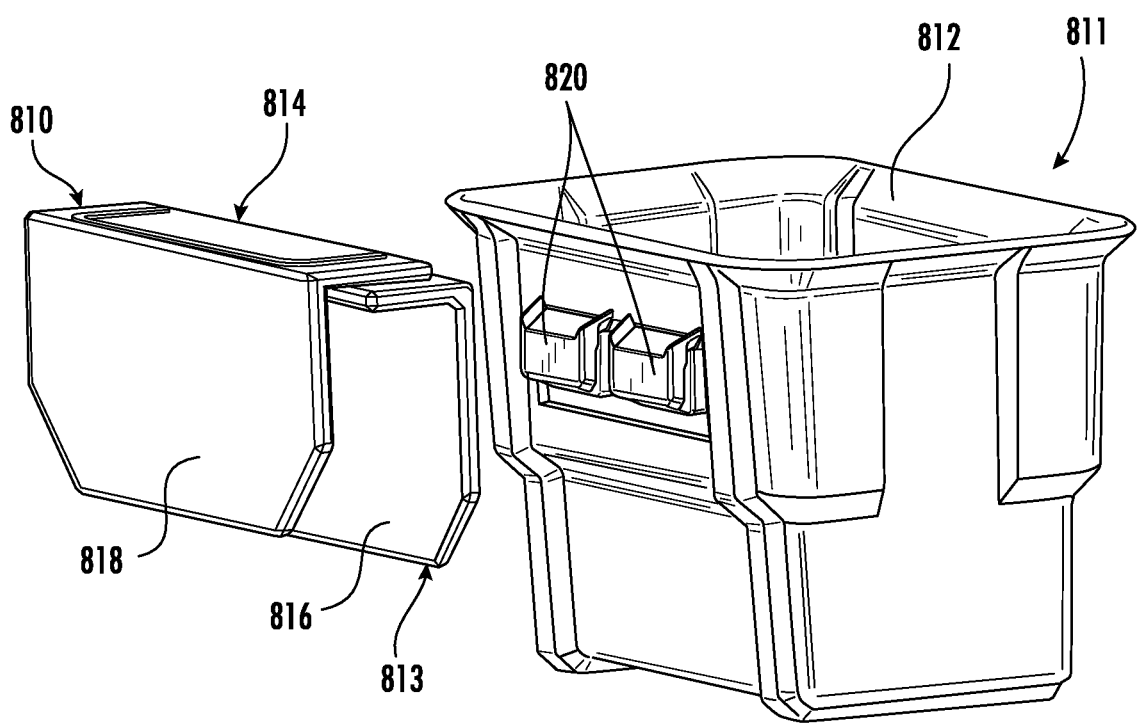
FIG. 23 is a perspective view from the front of the tool storage device shown in FIG. 22, according to an exemplary embodiment.

As shown in FIGS. 22-23, mounting mechanism 810 is an adjustable bracket that includes a first bracket component 813 slidably coupled to a second bracket component 814. First bracket component 813 includes a first sidewall 816, and second bracket component 814 includes a second sidewall 818, positioned opposite the first sidewall 816. When first bracket component 813 is adjusted or slid with respect to second bracket component 814 the distance between first sidewall 816 and second sidewall 818 is adjusted, specifically, is narrowed or widened, to accommodate mounting walls of varying thicknesses and/or mounting lips of varying sizes.

Further, in specific embodiments, a plurality of first coupling components, specifically cleats 820, are coupled to an outer wall of tool tray 812, extending toward mounting mechanism 810, when tool tray 812 is coupled to mounting mechanism 810. In various embodiments, cleats 820 are similar to cleats 760. In particular, cleats 820 include a central body and ribs extending from the body in opposing directions, the ribs defining a channel including a closed back end (the upper end) and an open front end (the lower end).

Figure 24:
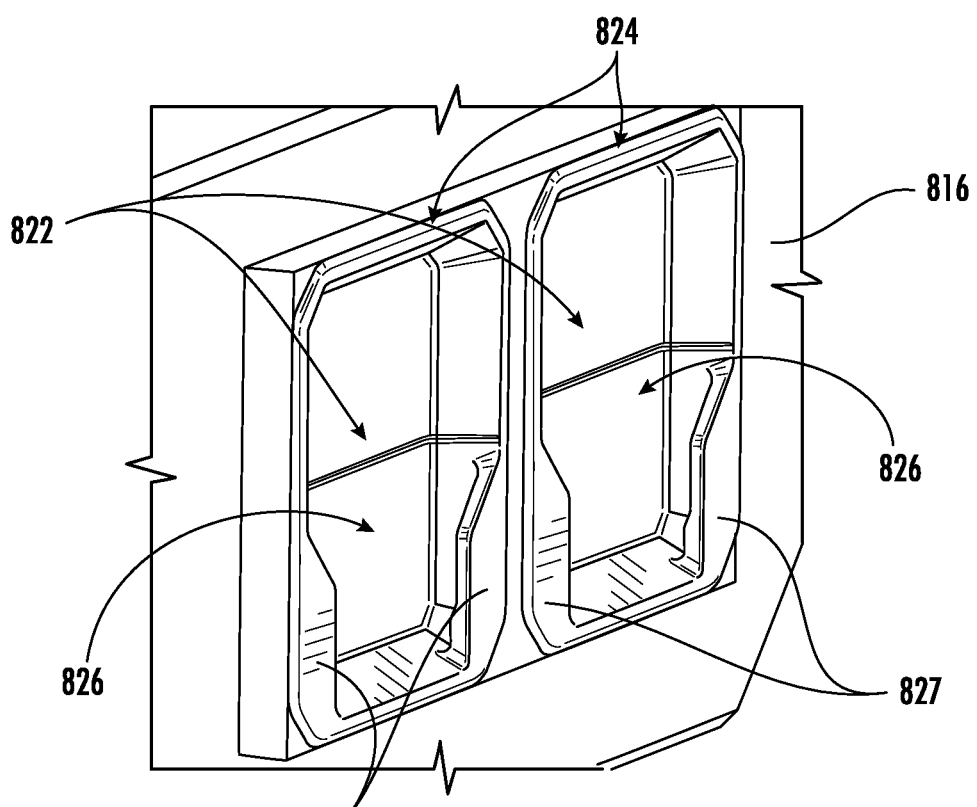
FIG. 24 is a detailed perspective view of a portion of the tool storage device shown in FIG. 22.
Figure 25:
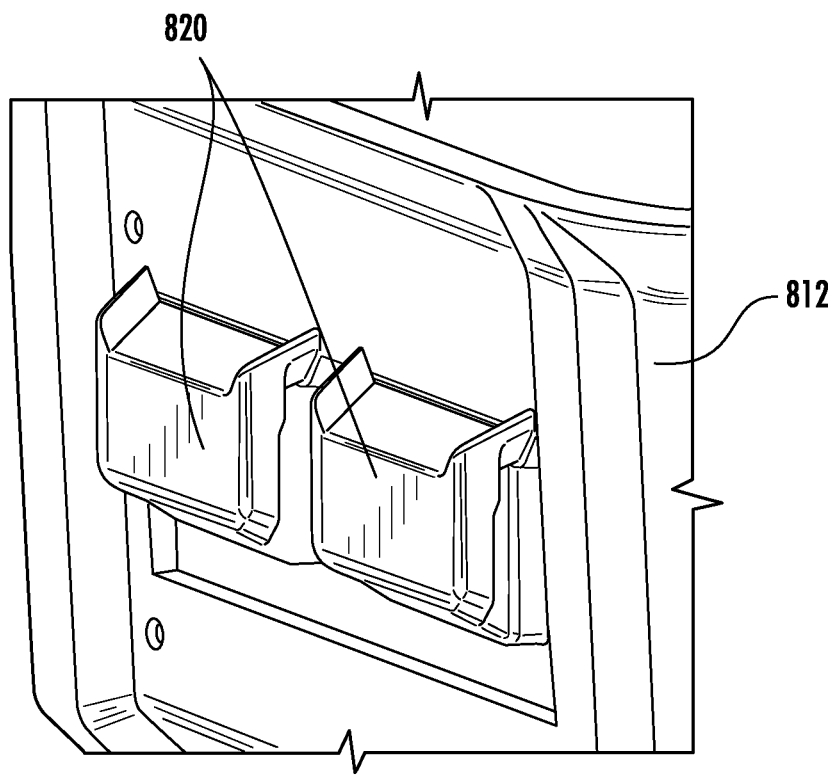
FIG. 25 is a detailed perspective view of a portion of the tool storage device shown in FIG. 23.

A first sidewall 816 of mounting mechanism 810 includes a corresponding plurality of second, coupling components, specifically pockets 822, that receive and mate with cleats 820 to releasably couple tool tray 812 to mounting mechanism 810. As shown in FIGS. 22 and 24, pockets 822 include a pocket insert 824 positioned within a cavity 826 defined in first sidewall 816. Each pocket insert 824 is configured to receive a corresponding cleat 820 from above. Pocket inserts 824 each include two opposing arms 827, open at respective lower ends, to receive a corresponding cleat 820, the arms 827 extending above and offset from a recessed surface. As shown in FIGS. 17-21, the cleats 820 and pockets 822 are compatible with the corresponding standard cleats and pockets of the Milwaukee Tool PACKOUT system (e.g., cleats 820 and pockets 822 are compatible with the coupling mechanism(s) described in International Patent International Patent Publication No. WO 2017/191628, which is hereby incorporated by reference in its entirety).

Figure 26:
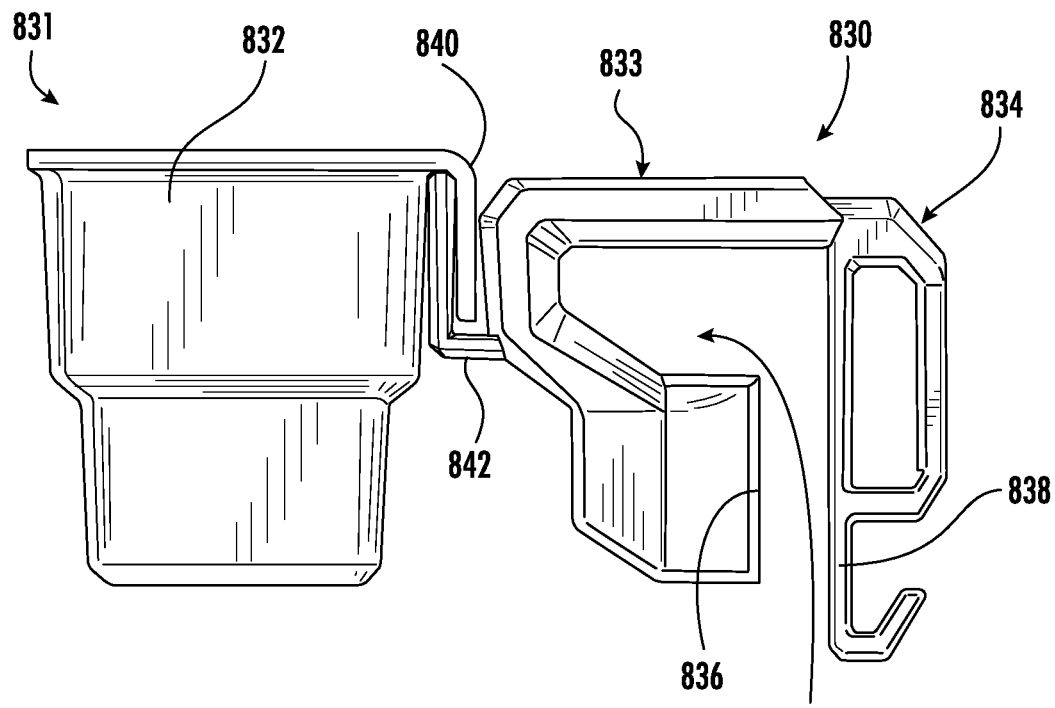
FIG. 26 is a side view of a tool storage device including a mounting mechanism, according to another exemplary embodiment.

Referring to FIG. 26, a tool storage device 831 is shown according to an exemplary embodiment. In general, mounting mechanism 830 acts to mount tool storage device 831 to a mounting wall, similar to tool storage device 11 discussed above, utilizing the different mechanisms discussed herein. Tool storage device 831 includes a mounting mechanism 830 removably coupled to a tool support, specifically, tool tray 832. As shown in FIG. 26, mounting mechanism 830 is an adjustable bracket that includes a first bracket component 833 slidably coupled to a second bracket component 834. First bracket component 833 includes a first sidewall 836, and second bracket component 834 includes a second sidewall 838, positioned opposite the first sidewall 836. When first bracket component 833 is adjusted or slid with respect to second bracket component 834 the distance between first sidewall 836 and second sidewall 838 is adjusted, specifically, is narrowed or widened, to accommodate mounting walls of varying thicknesses and mounting lips of varying sizes. As shown in FIG. 26, a cavity 839 is defined within first bracket component 833, above first sidewall 836 to accommodate a protruding lip at a mounting edge of the mounting wall.

In specific embodiments, a first coupling component, specifically a downward-opening L-shaped bracket 840 extends from tool tray 832. A corresponding second coupling component, specifically an upward-opening L-shaped bracket 842, extends from first bracket component 833 and is configured to receive and mate with downward-opening L-shaped bracket 840 to releasably couple tool tray 832 to mounting mechanism 830. Though FIG. 26 shows greater detail of the right side of the tool storage device 831, compared to the left side, the right side is substantially the same as the left side.

Figure 27:
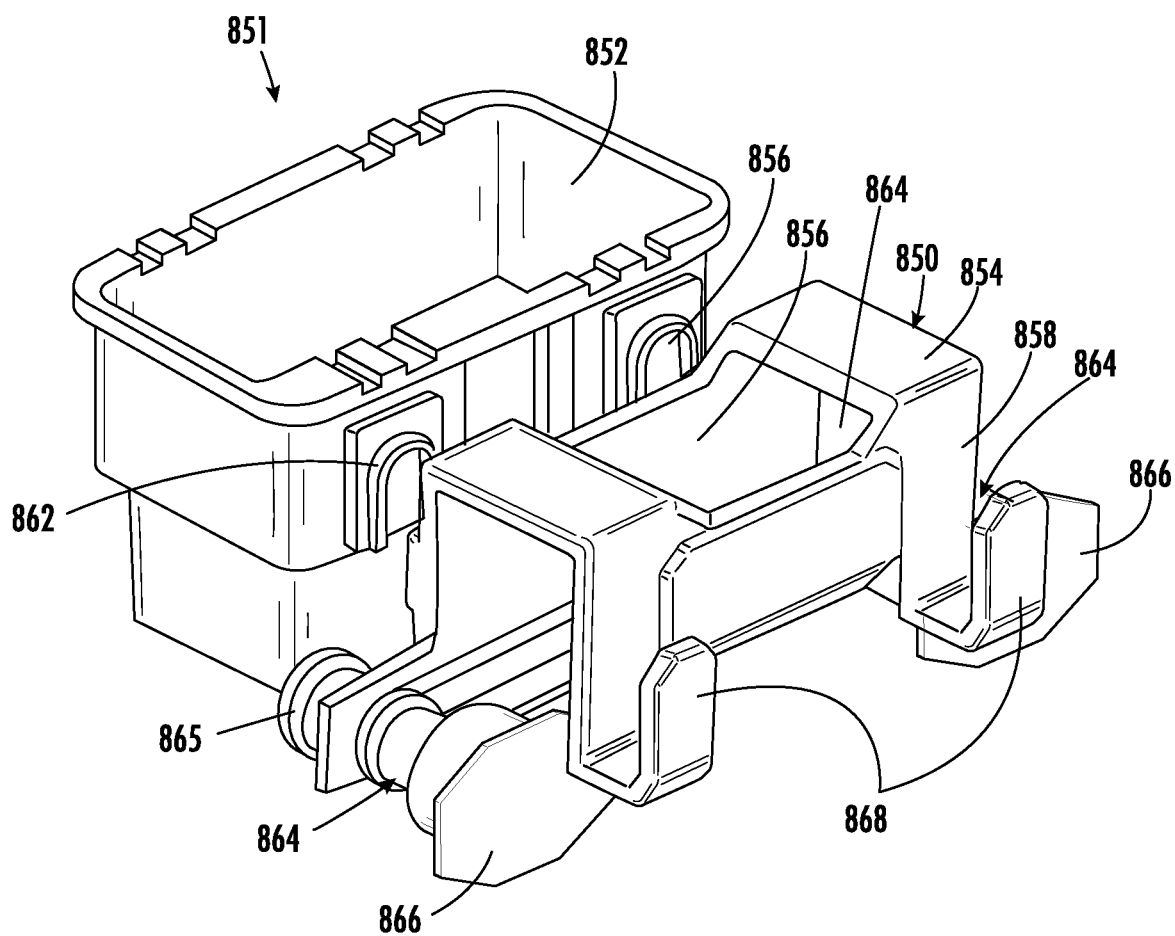
FIG. 27 is a top perspective view of a tool storage device including a mounting mechanism, according to another exemplary embodiment.

Referring to FIG. 27, a tool storage device 851 is shown according to an exemplary embodiment. Tool storage device 851 includes a mounting mechanism 850 configured to removably couple to a tool support, specifically, tool tray 852. In general, mounting mechanism 850 acts to mount tool storage device 851 to a mounting wall, similar to tool storage device 11 discussed above, utilizing the different mechanisms discussed herein. In specific embodiments, tool storage device 851 is configured to be mounted to a power utility bucket with a protruding lip. As shown in FIG. 27, mounting mechanism 850 is a bracket that includes a first sidewall 856 fixedly coupled to a second sidewall 858 by an upper wall 854.

In specific embodiments, a plurality of first coupling components, specifically cleats (e.g., similar to cleat 820 and/or cleat 760), are coupled to first sidewall 856, extending toward the tool tray 852, when tool tray 852 is coupled to mounting mechanism 850. An outer surface of tool tray 852 includes a corresponding plurality of second coupling components, specifically downward-opening, U-shaped pockets 862, that respectively receive and mate with the cleats to releasably couple tool tray 852 to mounting mechanism 850. In various embodiments, the cleats and pockets of the embodiment shown in FIG. 27 are substantially the same as the cleats 720 and pockets 722 shown in FIGS. 14-16 above.

Additionally, as shown in FIGS. 27, a pair of spacer arms 864 are coupled to the mounting mechanism 850. A first end 865 of each spacer arm 864 extends between the first sidewall 856 and the mounting wall when tool storage device 851 is mounted to the mounting wall. A second end 866 of each spacer arm 864 extends between first sidewall 856 and tool tray 852 when tool tray 852 is coupled to mounting mechanism 850. As such, spacer arms 864 serve to support tool tray 852 in an upright position when tool storage device 851 is mounted to a mounting wall. Further, a plurality of hooks 868 extends from the second sidewall 858, such that hooks 868 extend into an interior of the power utility bucket, when the tool storage device is coupled to the power utility bucket, allowing tools, cords, etc. to be hung on the power utility bucket interior.

Tool Storage Device for Corner Mounting

Figure 28:
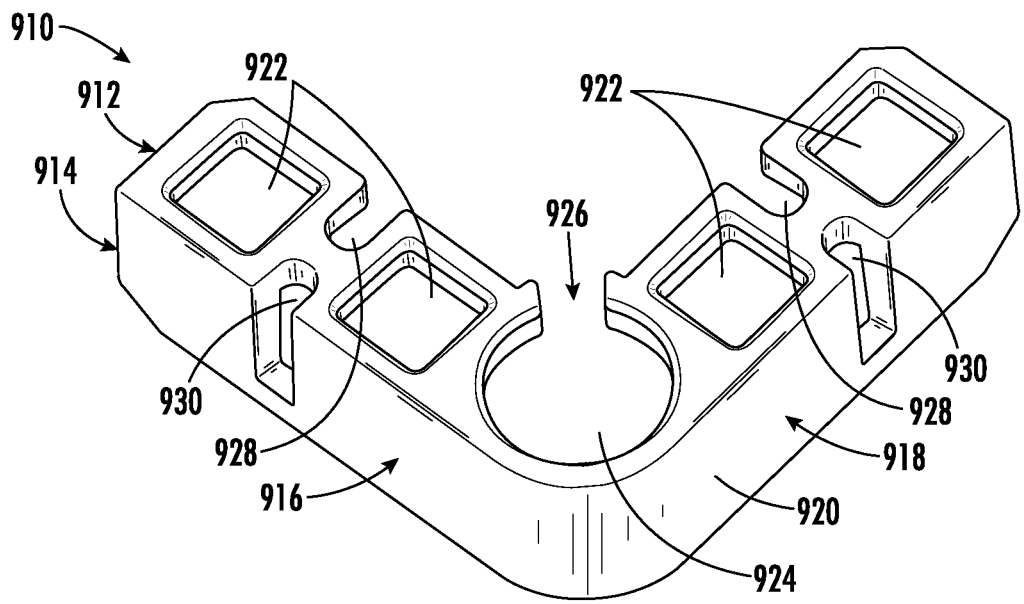
FIG. 28 is a perspective view from above of a tool storage device, according to another exemplary embodiment.
Figure 29:
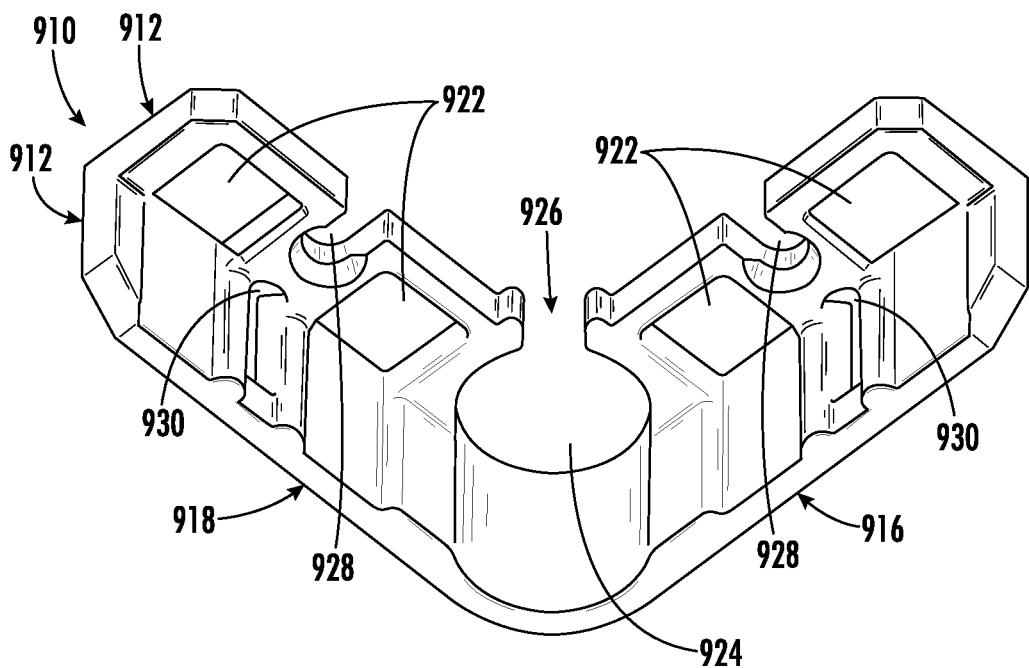
FIG. 29 is a perspective view from below of the tool storage device shown in FIG. 28, according to an exemplary embodiment.
Figure 30:
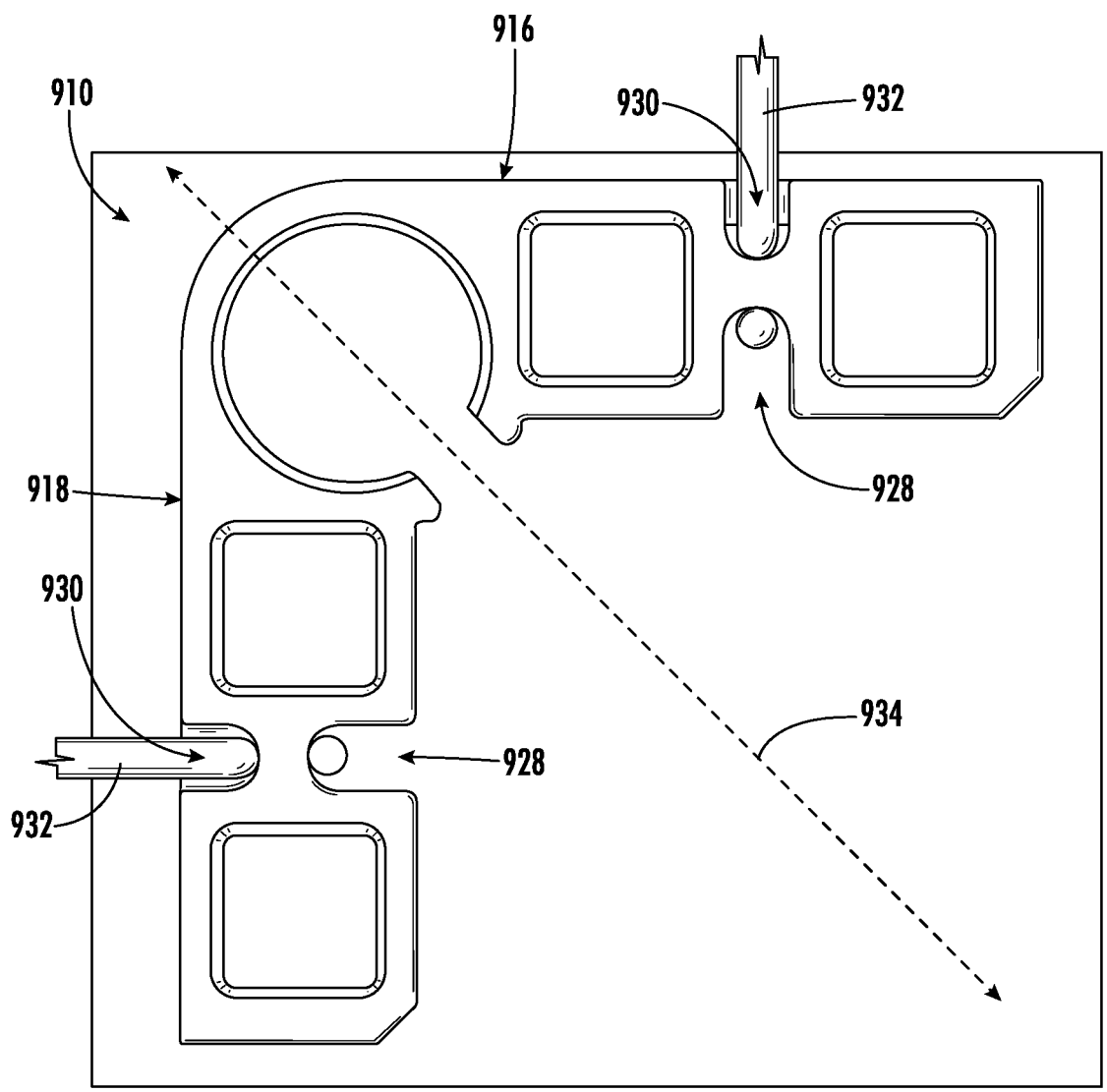
FIG. 30 is a top view of the tool storage device shown in FIG. 28 coupled to a pair of mounting hooks, according to an exemplary embodiment.

Referring generally to FIGS. 28-30, a tool storage device configured for mounting to an interior corner of a mounting wall or edge is shown, according to an exemplary embodiment. Within a power utility bucket, the corner spaces often remain unutilized in terms of hanging storage. Common tool storage devices are designed to mount to a linear mounting edge, rather than to a mounting edge that includes a curve or angle, such as where a corner is formed.

Applicant has designed a tool storage device that can be mounted to a curved or angled edge, such as a corner edge of a power utility bucket. The tool storage device is configured to receive and support one or more mounting mechanisms, such as mounting hooks, that can mount and/or suspend the tool support from the curved edge. As explained in more detail below, this corner-mounted storage device discussed herein includes pairs of mounting channels (rather than mounting hole/slot pairs typical in other designs) that receive hooks to support the device from the bucket corner. Applicant has found the pairing of two mounting channels for receiving each bucket hook to increase the ease of hook insertion and removal in contrast to similar pairings that instead include one or more closed holes for receiving at least a portion of the bucket hook.

Referring to FIGS. 28-30, a tool storage device 910 is shown. As shown in FIGS. 28-30, tool storage device 910 is a tool holster with a generally L-shaped cross-section formed by an upper wall 912 and a sidewall 914 that extends perpendicularly from an exterior edge of upper wall 912. Tool storage device 910 also has a first leg 916 and a second leg 918 that together define a generally perpendicular angle.

Sidewall 914 has an exterior surface 920. As shown in FIG. 28, exterior surface 920 forms a rounded corner where first leg 916 meets second leg 918, allowing tool storage device 910 to be mounted to an interior corner of a standard power utility bucket. In specific embodiments first leg 916 forms an approximately 90 degree or substantially perpendicular angle with second leg 918.

A plurality of first support openings 922 are formed in the upper wall 912. First support openings 922 are configured to support a variety of tools, such as wrenches, hammers, carabiners, large hand tools, etc. In specific embodiments first support openings 922 are substantially the same size and shape. As shown in FIGS. 28-30, first support openings 922 are square. Additionally, a second support opening 924 is formed in upper wall 912. Second support opening 924 is formed in an interior corner where first leg 916 meets second leg 918. As shown in FIGS. 28-30, second support opening 924 is circular. In specific embodiments, second support opening 924 is configured to support a 7/16" impact with both an auger bit and battery attached to the impact. In more specific embodiments, second support opening 924 has a 3-inch diameter. In other more specific embodiments, the diameter of second support opening 924 ranges from 38.0 mm to 48.0 mm. In the embodiment shown in FIGS. 28-30, a gap 926 is defined along at least a portion of the interior edge of the upper wall adjacent to second support opening 924, such that at least a portion of second support opening 924 is open toward the interior of tool storage device 910.

Tool storage device 910 also includes a pair of channels formed in each leg 916, 918. Each pair of channels includes a first channel 928 formed in upper wall 912 and a corresponding second channel 930 formed in both upper wall 912 and sidewall 914. In specific embodiments, each first channel 928 opens toward the interior of tool storage device 910. In certain specific embodiments, the portion of each second channel 930 formed in the upper wall 912 opens toward the exterior of tool storage device 910, and the portion of each second channel 930 formed in sidewall 914 opens toward the upward direction.

Referring to FIG. 30, in specific embodiments, each pair of first and second channels 928, 930 is configured to receive and support a mounting mechanism, such as a bucket hook 932, configured to mount tool storage device 910 to a respective mounting edge. Additionally, in specific embodiments, first leg 916 is symmetrically oriented with second leg 918 about a central horizontal axis 934 of tool storage device 910.

Referring generally to FIGS. 31-34, a tool storage device 950 configured for mounting to an interior corner of a mounting wall or edge is shown, according to an exemplary embodiment. Tool storage device 950 is substantially the same as tool storage device 910, except for the differences described herein. Tool storage device 950 is configured to be mounted by hooks, such as bucket hooks. Applicant has found that lowering the position of the hook with respect to the tool storage device, when the hook is coupled to the tool storage device, precludes an interior end tip of the hook from bumping or jostling the tools supported by the tool storage device and, more specifically, the power buttons or triggers located on such tools. Additionally, Applicant has found such a configuration to move the center of gravity of the mounted tool storage device closer to the center of the device, increasing the stability of the tool storage device. Applicant has found this increased stability to be particularly beneficial when the device is unevenly loaded with tools.

Figure 31:
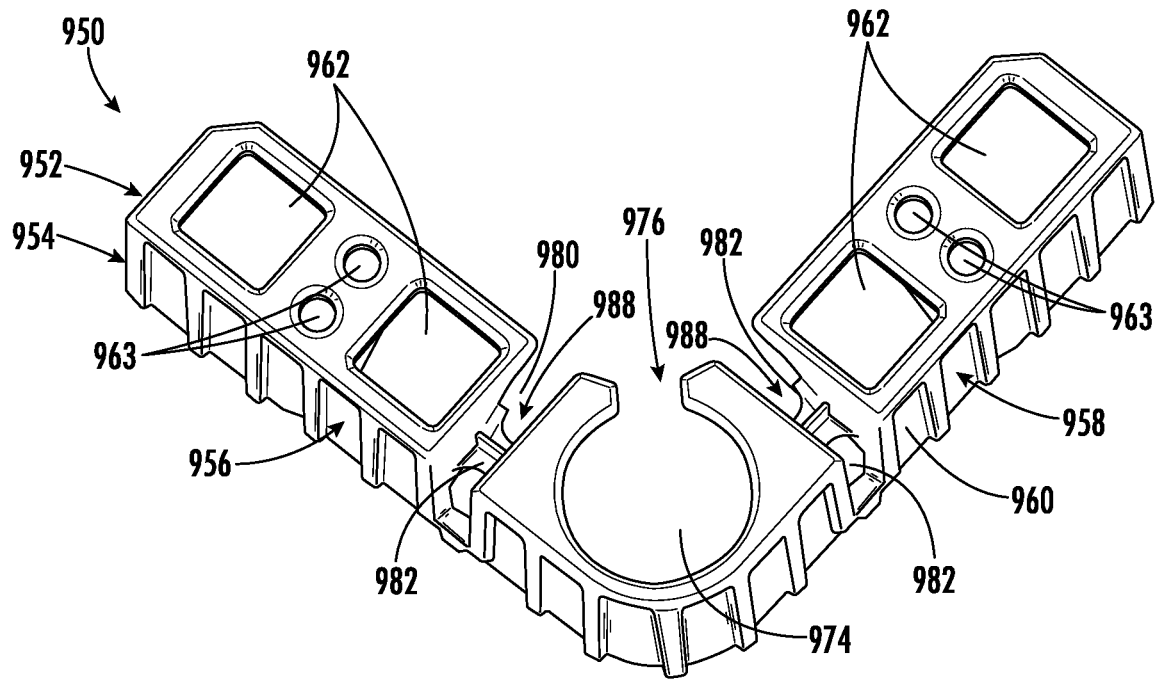
FIG. 31 is a perspective view from above of a tool storage device, according to another exemplary embodiment.
Figure 32:
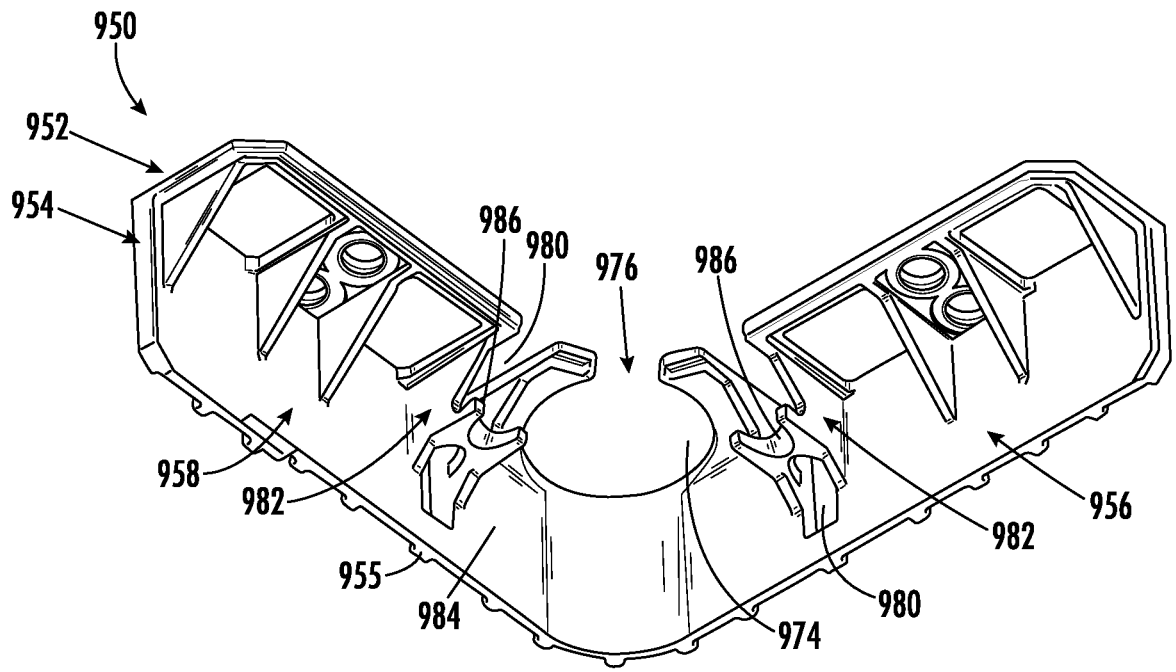
FIG. 32 is a perspective view from below of the tool storage device shown in FIG. 31, according to an exemplary embodiment.

Referring to FIGS. 31-32, various perspective views of tools storage device 950 are shown. In specific embodiments, tool storage device 950 is a tool holster with a generally L-shaped cross-section formed by an upper wall 952 and a sidewall 954 that extends perpendicularly from an exterior edge of upper wall 952. Tool storage device 950 also has a first leg 956 and a second leg 958 that together define a generally perpendicular angle.

Sidewall 954 has an exterior surface 960. As shown in FIG. 31, exterior surface 960 forms a rounded corner where first leg 956 meets second leg 958, allowing tool storage device 950 to be mounted to an interior corner of a standard power utility bucket. In specific embodiments first leg 956 forms an approximately 90 degree or substantially perpendicular angle with second leg 958.

A plurality of support openings are formed in the upper wall 952. A plurality of first support openings 962 are configured to support a variety of tools, such as wrenches, hammers, carabiners, large hand tools, etc. In specific embodiments first support openings 962 are substantially the same size and shape. In certain specific embodiments, first support openings 962 are square. Additionally, a second support opening 964 is formed in upper wall 952. Second support opening 964 is formed in an interior corner where first leg 956 meets second leg 958. As shown in FIGS. 31-32, second support opening 964 is circular. In specific embodiments, second support opening 964 is configured to support a 7/16" impact with both an auger bit and battery attached to the impact. In more specific embodiments, second support opening 964 has a 3-inch diameter. In other more specific embodiments, the diameter of second support opening 964 ranges from 38.0 mm to 48.0 mm. In the embodiment shown in FIGS. 31-32, a gap 966 is defined along at least a portion of the interior edge of the upper wall adjacent to second support opening 964, such that at least a portion of second support opening 964 is open toward the interior of tool storage device 950. In specific embodiments, a plurality of third support openings 973, are additionally formed in upper wall 952. In certain specific embodiments, third support openings 963 are circular and sized to receive tools with thin and/or circular necks, such as screwdrivers.

Tool storage device 950 also includes a channel 980 formed in each leg 956, 958. Each channel is L-shaped and configured for receiving a hook, such as a bucket hook 990 (shown in FIGS. 33 and 34), for mounting tool storage device 950 to a mounting edge, such as an upper edge of the bucket of a bucket truck. In specific embodiments, a hook support 982 extends inwardly from an interior surface 984 of sidewall 954 at a location corresponding to each channel 980. In certain specific embodiments, hook support 982 also extends downwardly from upper wall 952. Additionally, hook support 982 includes a ledge 986 configured to engage the hook when the hook is positioned within the channel 980. In specific embodiments, ledge 986 forms an opening 988 for receiving the hook when the hook engages ledge 986. As shown in FIG. 32, opening 988 is a partial opening that opens inwardly toward the center of tool storage device 950.

In specific embodiments, ledge 986 is positioned below upper wall 952. In specific embodiments, ledge 986 is generally centrally located spaced from upper wall 952 and a lower edge 955 of sidewall 954. Applicant has found supporting a hook, such as bucket hook 990 shown in FIGS. 33-34, from a position spaced between upper wall 952 and lower edge 955 (in contrast to a position vertically aligned with the upper wall) to move the center of gravity of mounted tool storage device 950 closer to the center of tool storage device 950. Applicant has found this shift in the center of gravity to increase the stability of tool storage device 950, particularly when tool storage device 950 is loaded unevenly with tools.

Figure 33:
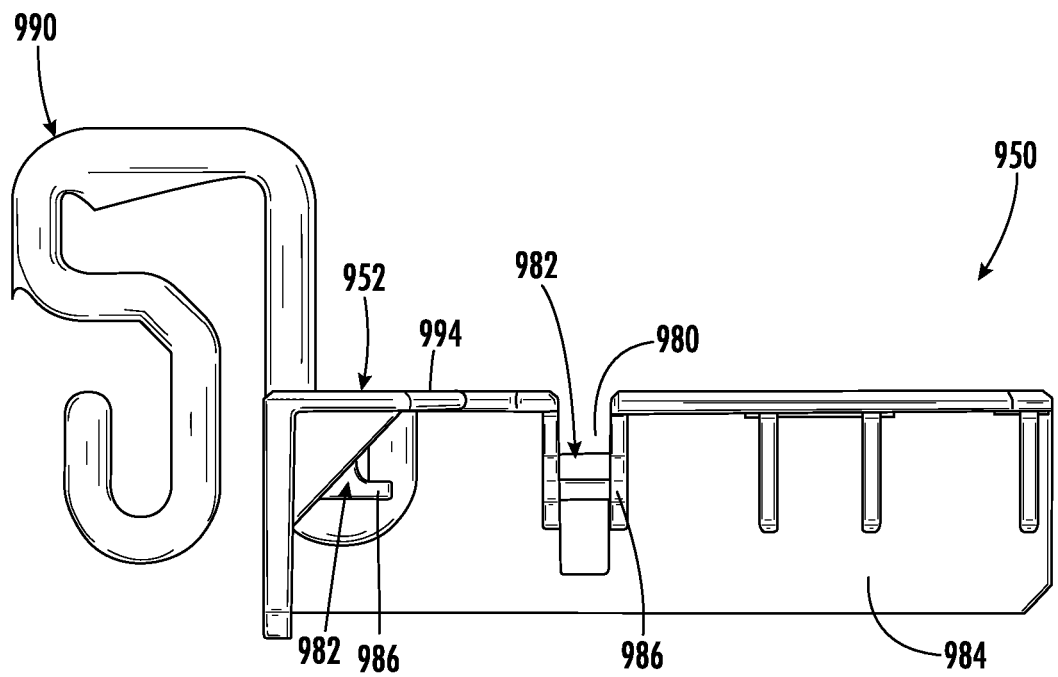
FIG. 33 is a side view of the tool storage device shown in FIG. 31 coupled to a mounting hook, according to an exemplary embodiment.
Figure 34:
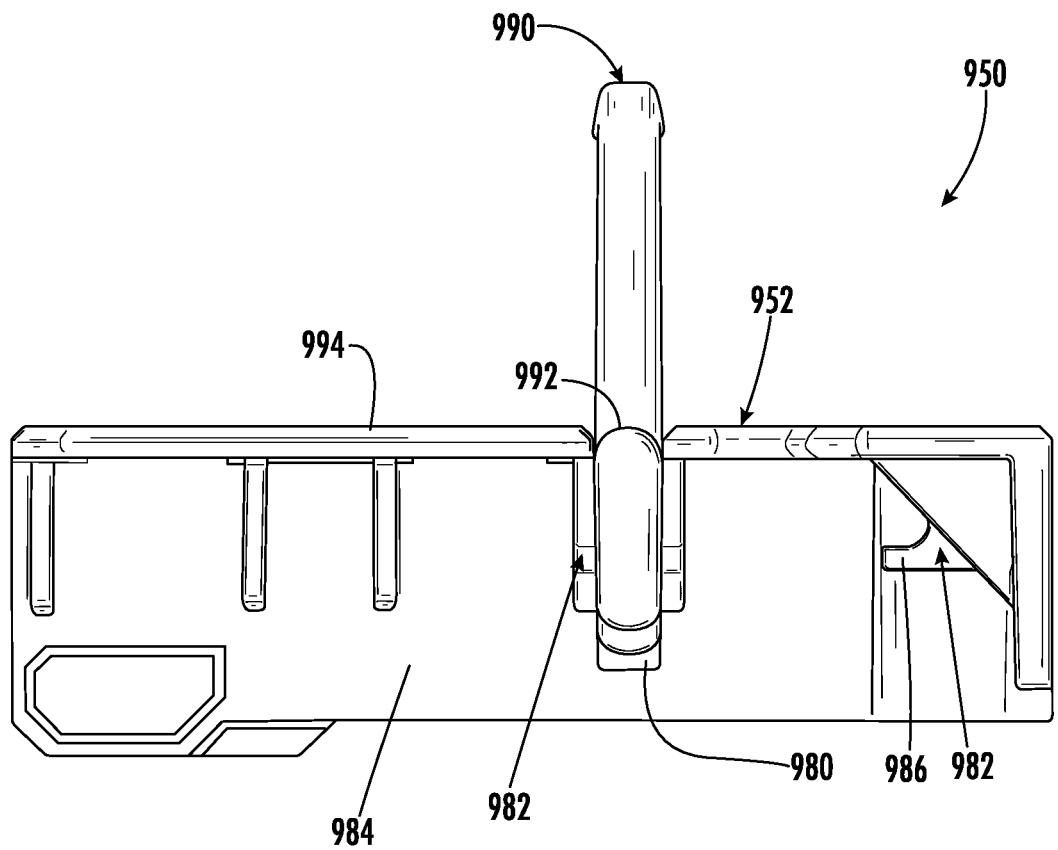
FIG. 34 is a front view of the tool storage device shown in FIG. 31 coupled to a mounting hook, according to an exemplary embodiment.

Referring to FIGS. 33-34, a bucket hook 990 is shown coupled to tool storage device 950. When bucket hook 990 is positioned within channel 980, bucket hook 990 engages hook support 982. In specific embodiments, opening 988 (see FIG. 31), formed within ledge 986, receives bucket hook 990 when bucket hook 990 is engaged with hook support 982. As shown in FIGS. 33-34, ledge 986 is positioned below upper wall 952 such that an end tip 992 of bucket hook 990 located within the interior of the tool storage device remains flush with or below a plane defined by the exterior surface 994 the upper wall 952 when bucket hook 990 is engaged with ledge 986. As such, end tip 992 is precluded from bumping or jostling tools, and more specifically the power buttons or power triggers of tools, stored in tool storage device 950.

Referring to FIGS. 35-44, various aspects of tool storage device 1010 are shown. Tool storage device 1010 is substantially the same as tool storage device 910 or tool storage device 950 except for the differences discussed herein. In various embodiments, tool storage device 1010 is configured to couple to an interior corner 1002 of a mounting wall 1004 via one or more hooks 990.

Tool storage device 1010 includes an upper wall 1020, a plurality of support openings 1090 formed in the upper wall 1020, a sidewall 1040 including a first portion 1046 and a second portion 1048 generally perpendicular to the first portion 1046, a first channel 1070 defined by a first portion 1046 of the sidewall 1040, a first support wall 1072, a second support wall 1076, and a support 1060 extending between an intersection of the first support wall 1072 and the upper wall 1020 and an intersection of the second support wall 1076 and the upper wall 1020. The upper wall 1020 defines an upper surface 1022 and an opposing lower surface 1024.

The plurality of support openings 1090 are configured to support a plurality of tools (e.g., power drill). In various embodiments, the plurality of support openings 1090 include a first subset 1092 of support openings 1090 that each define a square-shaped opening of a first size. In various embodiments, the plurality of support openings 1090 include a second subset 1094 of support openings 1090 that each define a circular-shaped opening of a second size less than the first size.

In various embodiments, upper wall 1020 includes a first portion 1026 extending from the first portion 1046 of the sidewall 1040 and a second portion 1028 extending from the second portion 1048 of the sidewall 1040. The plurality of support openings 1090 include a first opening 1096 between the first portion 1026 of the upper wall 1020 and the second portion 1028 of the upper wall 1020. In various embodiments, tool storage device 1010 includes a corner 1050 extending between the first portion 1046 of the sidewall 1040 and the second portion 1048 of the sidewall 1040, the first opening 1096 including an aperture 1098 opposite the corner 1050. In use, a user can slide the handle of a tool (e.g., a power drill) through aperture 1098 to rest the tool within first opening 1096. In various embodiments, first opening 1096 is curved such that first opening 1096 defines a portion of a circle.

The sidewall 1040 extends from the lower surface 1024 of the upper wall 1020, and the sidewall 1040 defines an outer surface 1042 and an opposing inner surface 1044. The first channel 1070 is configured to receive a hook that detachably couples the sidewall 1040 and the upper wall 1020 to the mounting wall. The first support wall 1072 extends from the inner surface 1044 and defines a first side 1074 of the first channel 1070. The second support wall 1076 extends from the inner surface 1044 and defines a second side 1078 of the first channel 1070 opposite the first side 1074. In various embodiments, support 1060 defines an upper surface 1062 that is coplanar with upper surface 1022 of upper wall 1020.

Upper wall 1020 defines a channel 1080 above the first channel 1070. Channel 1080 and channel 1070 are configured to collectively receive the hook that detachably couples the sidewall 1040 and the upper wall 1020 to the mounting wall. Channel 1080 extends from an open front end 1082 (proximate sidewall 1040) to a closed back end 1084 opposite the front end 1082, the closed back end 1084 defined at least in part by the support 1060.

In various embodiments, tool storage device 1010 includes one or more channels 1170 in second portion 1048 of sidewall 1040 and one or more channels 1180 in second portion 1028 of upper wall 1020. It will be understand that channel 1170 and channel 1180 are the same as channel 1070 and channel 1080, respectively, with the exception that channel 1070 and channel 1080 are located in different portions of sidewall 1040 and upper wall 1020 than channel 1170 and channel 1180. Thus, channel 1170 and/or channel 1180 are configured to receive a second hook to couple tool storage device 1010 to a mounting wall.

Figure 40:
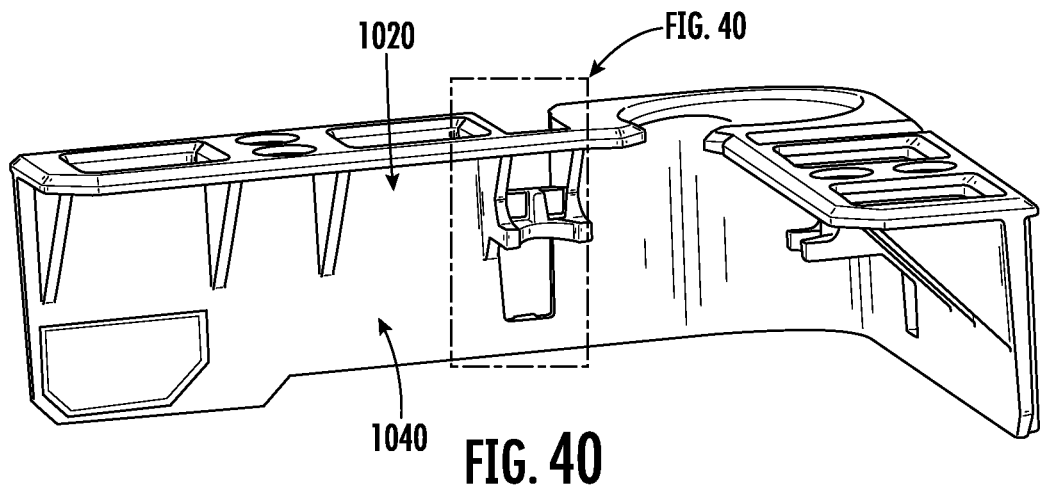
FIG. 40 is a perspective view of the tool storage device of FIG. 35, according to an exemplary embodiment.
Figure 41:
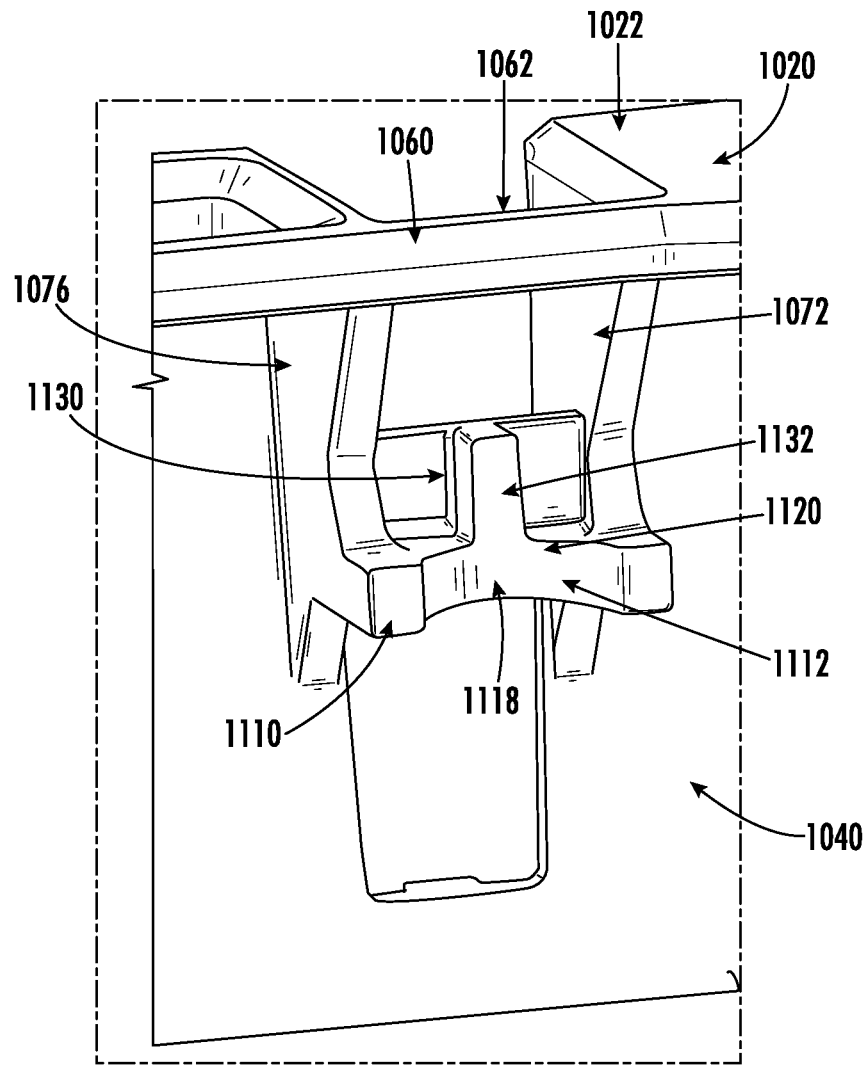
FIG. 41 is a detailed perspective view of the tool storage device of FIG. 35, according to an exemplary embodiment.

Referring to FIGS. 40-41, various aspects of channel 1070 and channel 1080 are shown. Bridge 1110 extends between the first support wall 1072 and the second support wall 1076. Bridge 1110 defines a recess 1120 including a recessed surface 1112 that is facing away from the outer surface 1042 of the first portion 1046 of the sidewall 1040. In various embodiments, recessed surface 1112 defines a concave surface with respect to the first portion 1046 of the sidewall 1040. Tool storage device 1010 includes support wall 1130 extending from bridge 1110 towards the upper wall 1020, the support wall 1130 defining an inner surface 1132 facing away from the outer surface 1042 of the first portion 1046 of the sidewall 1040. In various embodiments, support wall 1130 extends above a center 1118 of the recessed surface 1112. In various embodiments, the inner surface 1132 is coplanar with the center 1118 of recessed surface 1112.

Figure 42:
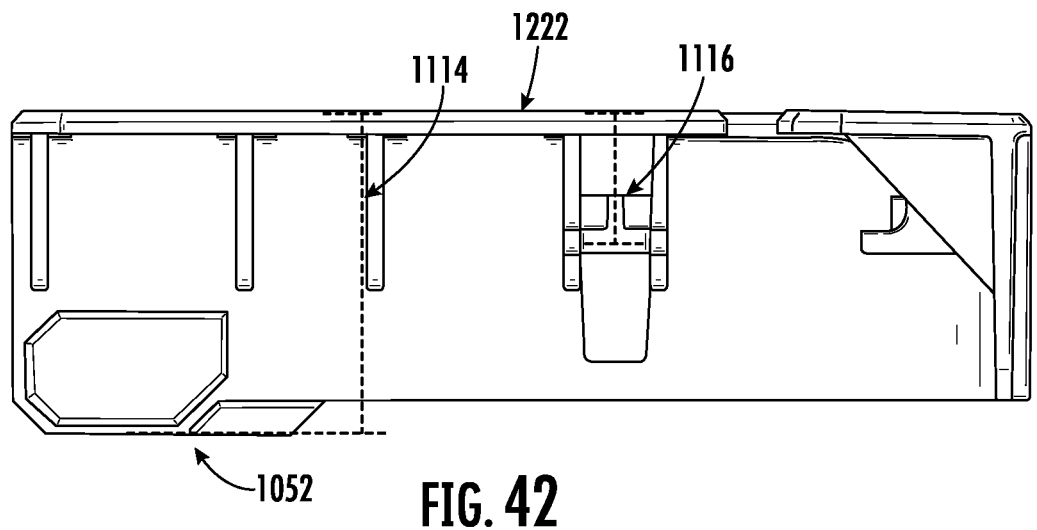
FIG. 42 is a rear view of the tool storage device of FIG. 35, according to an exemplary embodiment.

Referring to FIG. 42, various aspects of tool storage device 1010 are shown. In various embodiments, distance 1116 from upper surface 1022 of upper wall 1020 to bridge 1110 is between 30% and 70% of distance 1114 from upper surface 1022 of upper wall 1020 to bottom surface 1052 of sidewall 1040, and more specifically is between 40% and 60%.

Figure 43:
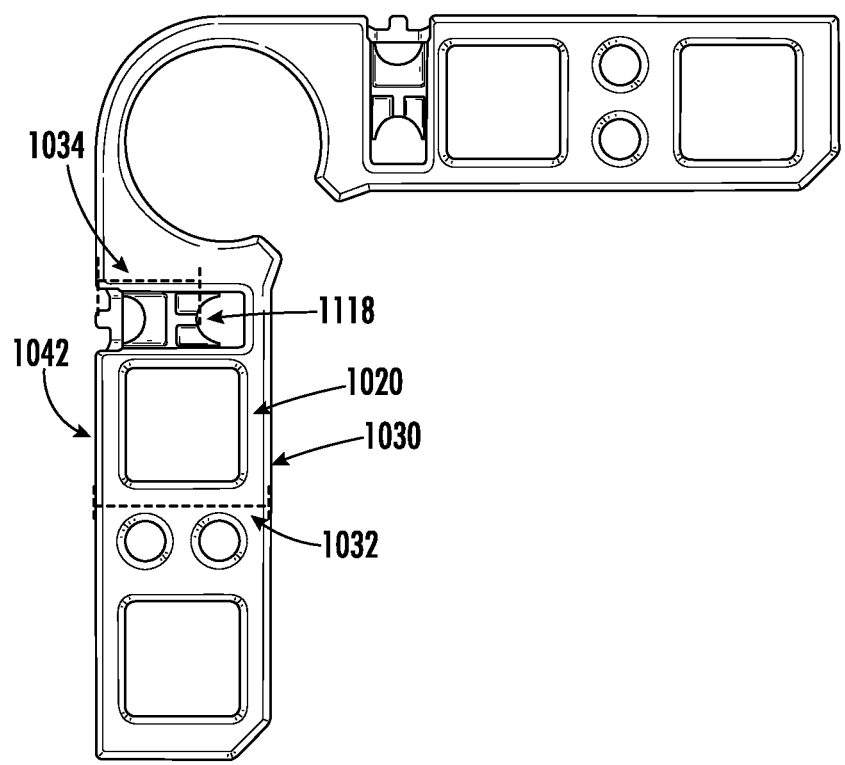
FIG. 43 is a top view of the tool storage device of FIG. 35, according to an exemplary embodiment.

Referring to FIG. 43, various aspects of tool storage device 1010 are shown. In various embodiments, distance 1034 from outer surface 1042 of sidewall 1040 to center 1118 of recess 1120 is between 40% and 80% of distance 1032 from outer surface 1042 of sidewall 1040 to inner surface 1030 of upper wall 1020, and more specifically is between 50% and 70%.

In various embodiments, tool storage device 1010 is configured to be coupled to a wall at a location other than a corner. In this embodiments, tool storage device 1010 includes first portion of upper wall 1020 and first portion of sidewall 1040, and there is no second portion of either upper wall 1020 or sidewall 1040 perpendicular to the first portion. In this way, tool storage device 1010 can be coupled to a mounting wall at any location, including without limitation a middle of the mounting wall that is not proximate a corner of the mounting wall.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. In addition, as used herein, the article "a" is intended to include one or more component or element and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements or components of any of the other embodiments discussed above.

What is claimed is:

1. A tool support device configured to couple to an interior corner of a mounting wall, the tool support device comprising:
    an upper wall defining an upper surface and an opposing lower surface;
    a plurality of support openings formed in the upper wall, the plurality of support openings configured to support a plurality of tools;
    a sidewall extending from the lower surface, the sidewall comprising a first portion and a second portion generally perpendicular to the first portion, the sidewall defining an outer surface and an opposing inner surface, the sidewall extending from the lower surface to a bottom surface of the sidewall;
    a first channel defined by the first portion of the sidewall, the first channel configured to receive a hook that detachably couples the sidewall and the upper wall to the mounting wall;
    a first support wall extending from the inner surface, the first support wall defining a first side of the first channel;
    a second support wall extending from the inner surface, the second support wall defining a second side of the first channel opposite the first side;
    a bridge extending between the first support wall and the second support wall, the bridge defining a recess comprising a recessed surface that is facing away from the outer surface of the first portion of the sidewall, wherein the bridge is between 40% and 60% of a distance from the upper surface of the upper wall to the bottom surface of the sidewall; and
    a support extending between an intersection of the first support wall and the upper wall and an intersection of the second support wall and the upper wall.

2. The tool support device of claim 1, the support defining an upper surface that is coplanar with the upper surface of the upper wall.

3. The tool support device of claim 1, the upper wall defining a second channel above the first channel, the second channel and the first channel configured to collectively receive the hook that detachably couples the sidewall and the upper wall to the mounting wall.

4. The tool support device of claim 3, the second channel extending from an open front end to a closed back end opposite the front end, the closed back end defined at least in part by the support.

5. The tool support device of claim 1, the plurality of support openings comprising a first subset of support openings that each define a square-shaped opening of a first size.

6. The tool support device of claim 5, the plurality of support openings comprising a second subset of support openings that each define a circular-shaped opening of a second size less than the first size.

7. The tool support device of claim 1, the upper wall comprising a first portion extending from the first portion of the sidewall and a second portion extending from the second portion of the sidewall, the plurality of support openings comprising a first opening between the first portion of the upper wall and the second portion of the upper wall.

8. The tool support device of claim 7, comprising a corner extending between the first portion of the sidewall and the second portion of the sidewall, the first opening comprising a first aperture opposite the corner.

9. The tool support device of claim 1, the upper wall defining an inner surface opposite the outer surface of the first portion of the sidewall, wherein a center of the recessed surface is between 50% and 70% of a distance from the outer surface of the first portion of the sidewall to the inner surface of the upper wall.

10. The tool support device of claim 9, the support defining an upper surface that is coplanar with the upper surface of the upper wall.

11. The tool support device of claim 9, the upper wall defining a second channel above the first channel, the second channel and the first channel configured to collectively receive the hook that detachably couples the sidewall and the upper wall to the mounting wall.

12. The tool support device of claim 1, comprising a third channel defined by the second portion of the sidewall, the third channel configured to receive a second hook that detachably couples the sidewall and the upper wall to the mounting wall.

13. A tool support device configured to couple to an interior corner of a mounting wall, the tool support device comprising:
- an upper wall defining an upper surface and an opposing lower surface;
- a plurality of support openings formed in the upper wall, the plurality of support openings configured to support a plurality of tools;
- a sidewall extending from the lower surface, the sidewall comprising a first portion and a second portion generally perpendicular to the first portion, the sidewall defining an outer surface and an opposing inner surface;
- a first channel defined by the first portion of the sidewall, the first channel configured to receive a hook that detachably couples the sidewall and the upper wall to the mounting wall;
- a first support wall extending from the inner surface, the first support wall defining a first side of the first channel;
- a second support wall extending from the inner surface, the second support wall defining a second side of the first channel opposite the first side; and
- a bridge extending between the first support wall and the second support wall, the bridge defining a recess comprising a recessed surface that is facing away from the outer surface of the first portion of the sidewall; and
- a support wall extending from the bridge towards the upper wall, the support wall defining an inner surface facing away from the outer surface of the first portion of the sidewall, wherein the inner surface of the support wall is coplanar with a center of the recessed surface.

14. The tool support device of claim 13, wherein the recessed surface defines a concave surface with respect to the first portion of the sidewall.

15. The tool support device of claim 13, wherein the support wall extends above a center of the recessed surface.

16. The tool support device of claim 13, comprising a third channel defined by the second portion of the sidewall, the third channel configured to receive a second hook that detachably couples the sidewall and the upper wall to the mounting wall.

17. A tool support device configured to couple to an interior corner of a mounting wall, the tool support device comprising:
- an upper wall defining an upper surface and an opposing lower surface;
- a plurality of support openings formed in the upper wall, the plurality of support openings configured to support a plurality of tools;
- a sidewall extending from the lower surface to a bottom surface of the sidewall, the sidewall comprising a first portion and a second portion generally perpendicular to the first portion, the sidewall defining an outer surface and an opposing inner surface;
- a first channel defined by the first portion of the sidewall, the first channel configured to receive a hook that detachably couples the sidewall and the upper wall to the mounting wall;
- a first support wall extending from the inner surface, the first support wall defining a first side of the first channel;
- a second support wall extending from the inner surface, the second support wall defining a second side of the first channel opposite the first side; and
- a bridge extending between the first support wall and the second support wall, the bridge defining a recess comprising a recessed surface that is facing away from the outer surface of the first portion of the sidewall, wherein the bridge is between 30% and 70% of a distance from the upper surface of the upper wall to the bottom surface of the sidewall.

18. The tool support device of claim 17, the upper wall defining a second channel above the first channel, the second channel and the first channel configured to collectively receive the hook that detachably couples the sidewall and the upper wall to the mounting wall.

19. The tool support device of claim 18, comprising a third channel defined by the second portion of the sidewall, the third channel configured to receive a second hook that detachably couples the sidewall and the upper wall to the mounting wall.

* * * * *